March 28, 1950 H. ANDERSON 2,502,117

METHOD AND APPARATUS FOR LINING BLANKS

Filed March 17, 1948 14 Sheets-Sheet 1

INVENTOR
HELMER ANDERSON
BY William C. Babcock
ATTORNEY

March 28, 1950 H. ANDERSON 2,502,117
METHOD AND APPARATUS FOR LINING BLANKS
Filed March 17, 1948 14 Sheets-Sheet 2

INVENTOR
HELMER ANDERSON
BY William C. Babcock
ATTORNEY

March 28, 1950 H. ANDERSON 2,502,117

METHOD AND APPARATUS FOR LINING BLANKS

Filed March 17, 1948 14 Sheets-Sheet 3

INVENTOR

HELMER ANDERSON

BY William C. Babcock

ATTORNEY

INVENTOR

HELMER ANDERSON

BY William C. Babcock

ATTORNEY

March 28, 1950 H. ANDERSON 2,502,117

METHOD AND APPARATUS FOR LINING BLANKS

Filed March 17, 1948 14 Sheets-Sheet 5

INVENTOR

HELMER ANDERSON

BY William C. Babcock

ATTORNEY

METHOD AND APPARATUS FOR LINING BLANKS

Filed March 17, 1948 14 Sheets-Sheet 6

INVENTOR
HELMER ANDERSON
BY William C. Babcock
ATTORNEY

March 28, 1950 H. ANDERSON 2,502,117

METHOD AND APPARATUS FOR LINING BLANKS

Filed March 17, 1948 14 Sheets-Sheet 7

INVENTOR
HELMER ANDERSON
BY William C. Babcock
ATTORNEY

March 28, 1950 H. ANDERSON 2,502,117

METHOD AND APPARATUS FOR LINING BLANKS

Filed March 17, 1948 14 Sheets-Sheet 8

INVENTOR
HELMER ANDERSON
BY William C. Babcock
ATTORNEY

METHOD AND APPARATUS FOR LINING BLANKS

Filed March 17, 1948 14 Sheets-Sheet 9

INVENTOR
HELMER ANDERSON
BY William C. Babcock
ATTORNEY

METHOD AND APPARATUS FOR LINING BLANKS

Filed March 17, 1948 14 Sheets-Sheet 10

INVENTOR
HELMER ANDERSON
BY William C. Babcock
ATTORNEY

March 28, 1950 H. ANDERSON 2,502,117

METHOD AND APPARATUS FOR LINING BLANKS

Filed March 17, 1948 14 Sheets-Sheet 11

INVENTOR
HELMER ANDERSON
BY William C. Babcock
ATTORNEY

March 28, 1950 H. ANDERSON 2,502,117

METHOD AND APPARATUS FOR LINING BLANKS

Filed March 17, 1948 14 Sheets-Sheet 12

INVENTOR
HELMER ANDERSON
BY William C. Babcock
ATTORNEY

March 28, 1950 H. ANDERSON 2,502,117

METHOD AND APPARATUS FOR LINING BLANKS

Filed March 17, 1948 14 Sheets-Sheet 13

INVENTOR

HELMER ANDERSON

BY William C. Babcock

ATTORNEY

METHOD AND APPARATUS FOR LINING BLANKS

Filed March 17, 1948 14 Sheets-Sheet 14

INVENTOR
HELMER ANDERSON
BY William C. Babcock
ATTORNEY

Patented Mar. 28, 1950 2,502,117

UNITED STATES PATENT OFFICE 2,502,117

METHOD AND APPARATUS FOR LINING BLANKS

Helmer Anderson, Minneapolis, Minn., assignor to General Mills, Inc., a corporation of Delaware Application March 17, 1948, Serial No. 15,375

20 Claims. (Cl. 93—36.01)

This application relates to a method and apparatus for the manufacture of lined blanks and more particularly lined blanks of the type shown in the co-pending application of Clarence E. Felt and Lester F. Borchardt for Case liner, Serial No. 582,486 filed March 13, 1945, which is assigned to the same assignee as the present invention.

The blanks described and claimed in said co-pending application include a standard box blank provided with slots which separate the adjacent top and bottom flaps of the box. A lining is fastened to such a blank with portions of the lining overlapping the inner area of the flaps. It is desirable in such a case that the lining material be provided with slits corresponding to the slots in the blank so that the lining may be folded freely with the various flap portions.

It is accordingly one object of the present invention to provide an improved method and apparatus for the manufacture of lined blanks.

A further object is to provide a method of feeding blanks in spaced relation, applying a continuous strip of lining material to the series of spaced blanks, cutting the lining material between the blanks, and then slitting the lining material to correspond to the slots in the blanks.

Still another object is the provision of apparatus for carrying out the above method.

A further object is the provision of such an apparatus which has means to prevent the feeding of the blanks when the supply of lining material is interrupted combined with means to stop the feeding of the lining material whenever the supply of blanks is interrupted.

Still another object is to provide an improved slitting and folding unit for such an apparatus.

Another object is the provision of an apparatus in which blanks are fed longitudinally and continuously in spaced relation while a continuous strip of lining material is applied to the blanks and in which means are provided to cut the lining material between the blanks and then to move the blanks laterally and intermittently to a slitting station and a folding station.

A further object is the provision of improved combinations and control means in such apparatus.

Other objects and advantages will be apparent from the following specification in which a preferred form of the invention has been described with particular reference to the accompanying drawings.

In the drawings, wherein like reference characters indicate like parts,

Figure 1:
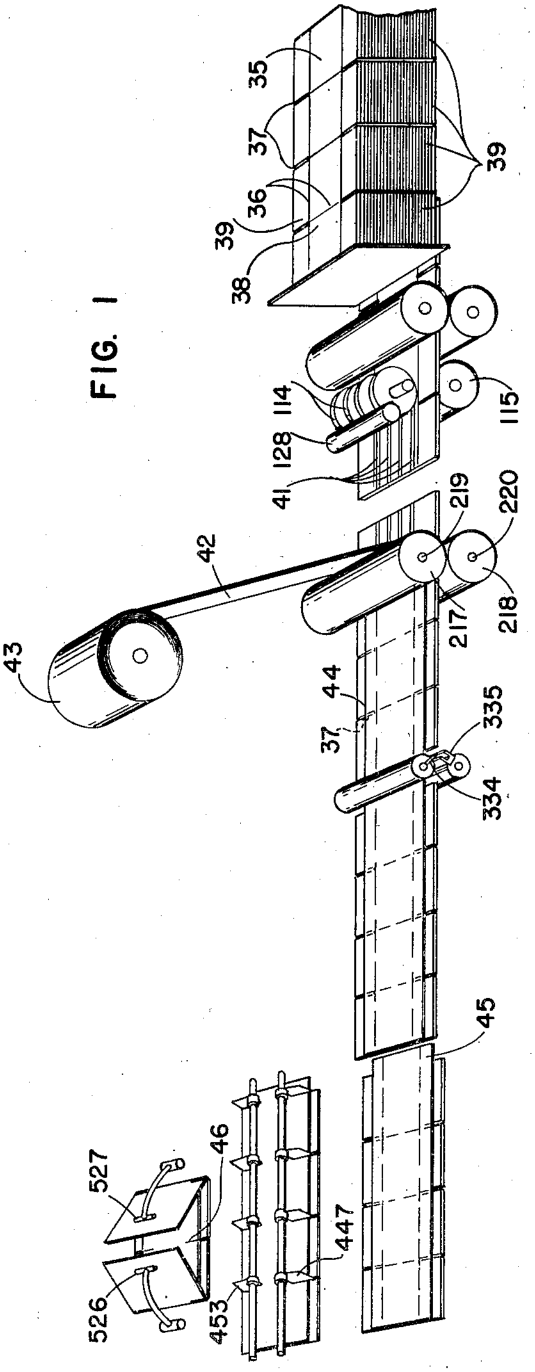
Fig. 1 is a perspective schematic view which illustrates the method and apparatus of the present invention.

The general nature of the method and apparatus of the present invention is illustrated in Fig. 1 of the drawing. As shown in this figure, the blanks 35 which are to be lined are arranged in a stack and are fed from one end of the stack, i. e., from the bottom in a direction perpendicular to the direction of the slots in the blank. Each blank 35 includes score lines 36 which assist in the ultimate folding of the blank. The blank is also provided with slots 37 which divide the outer edges of the blank into top and bottom flaps 39, each of which is attached to one of the body sections 38 of the blank.

The blanks are fed from the stack in spaced relation so that a line of blanks travels continuously through the first sections of the machine with the blanks spaced a pre-determined distance apart. A glue-applying roller 114 cooperates with a glue-feeding roller 128 to apply stripes 41 of adhesive longitudinally of each blank.

A continuous strip of lining material 42 is fed from a supply spool 43 and is laminated to the blank by means of the adhesive stripes and by cooperating laminating rolls, two of which, 217 and 218, are shown in Fig. 1. This lining material 42 is of a width which is greater than that of the body sections 38 of the blank so that the outer edges 42 of the lining overlap the top and bottom flaps 39 and a portion of the slots 37 between such flaps.

After the laminating operation, the lining material is severed between the blanks by cooperating cutting members 334 and 335. The point of severance is preferably shown immediately adjacent the forward edge of each blank so that a flap 45 extends from the trailing edge of each blank.

After the cutting operation, the lined blank with its trailing flap is moved transversely of the original line of feed to a slitting station where knives 467 and 453 slit the lining material to correspond to each of the slots 37 in the blank and also slit the lining material immediately adjacent the trailing edge of the blank.

Finally, the lined and slit blank is sent to a folding station at which folding bars 526 and 527 fold the former leading and trailing sections of the blank inwardly in juxtaposed relation where they may be taped or fastened to form a partially assembled flat box blank.

In order to facilitate the description of the method and apparatus according to the invention, the various sections and stations of the device are discussed separately below.

*Blank-feeding mechanism*

Figure 2:
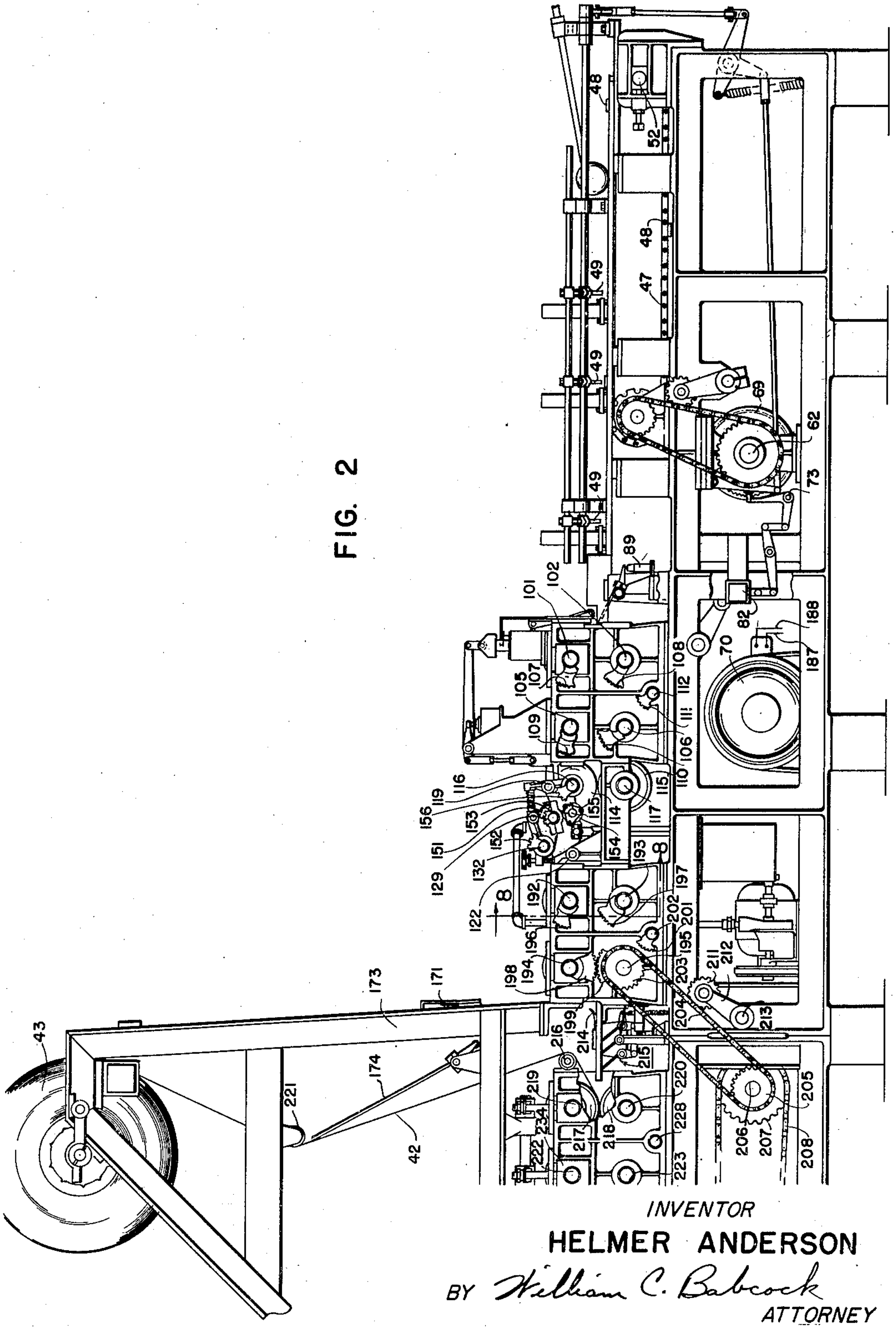
Fig. 2 is a side elevation of the feeding section, adhesive-applying section, and part of the laminating section of such an apparatus, certain portions being broken away for clarity.
Figure 5:
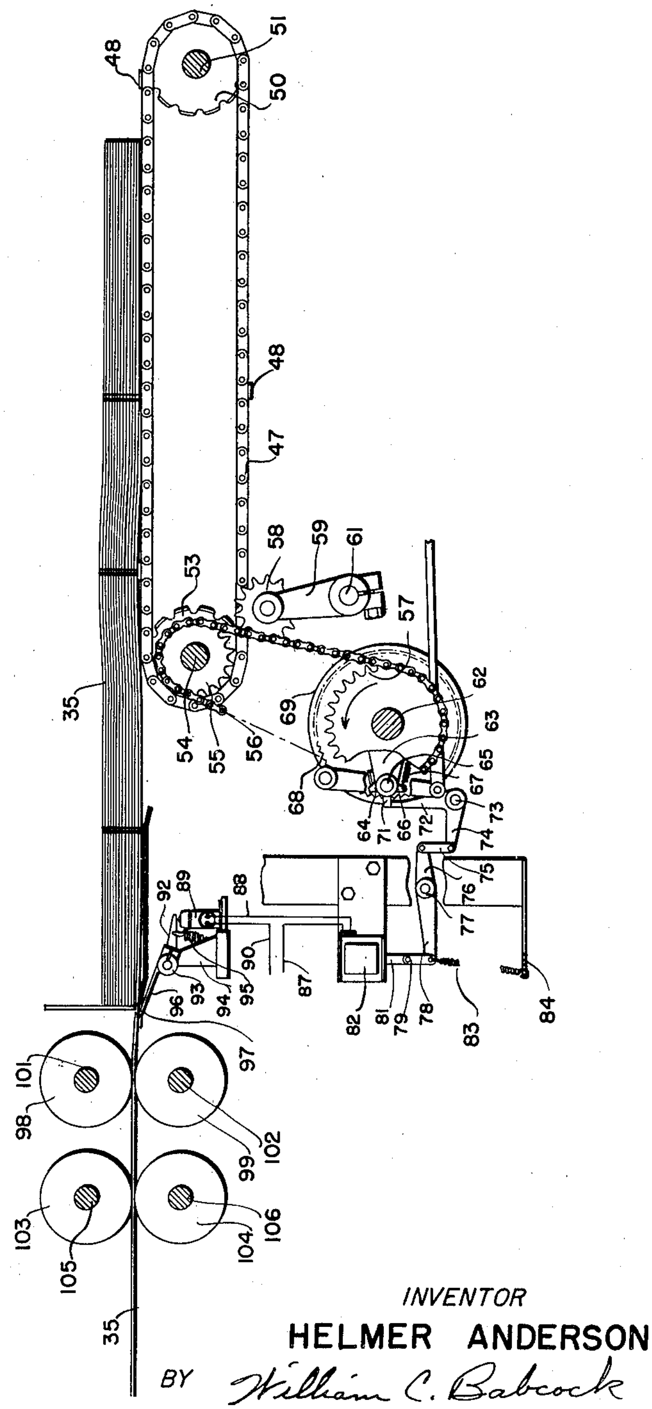
Fig. 5 is a partial schematic view of the feeding section of the machine.

The mechanism for feeding the blanks 35 and for controlling the space between successive blanks is particularly shown in Figs. 2 and 5. The blanks 35 are fed one at a time from the bottom of a stack by means of a pair of feeding chains 47 which carry lateral crossbars 48, the thickness of which is so adjusted that the bars 48 will engage only the bottom blank in the stack and will move that blank to the left in the figures toward the following sections of the machine.

In order to avoid interlocking engagement between the flaps of adjacent blanks, I prefer to utilize flap-deforming members 49, actuated in timed relation to the operation of feeding chains 47, as described and claimed in my co-pending application, Serial No. 4,013, filed January 23, 1948.

The feeding chains 47 are mounted at one end on idler sprockets 50 fastened to a shaft 51 carried in adjustable bearings 52 on the frame of the machine. The other ends of the chains are carried by drive sprockets 53 which are rigidly carried by a shaft 54 likewise journaled in the main frame. A drive sprocket 55, fastened to shaft 54, is in turn driven by a chain 56, the other end of which passes over a sprocket 57 on shaft 62. A suitable idler sprocket 58 carried by an arm 59 pivotally mounted at 61 may be resiliently urged against chain 56 to maintain the proper tension on the feed chain and hold it in engagement with the respective sprockets.

Shaft 62 is adapted to be driven intermittently by means of a one-revolution clutch. Such clutches are well known in the art. Thus, a clutch arm 63 is fastened to shaft 62. At the outer end of this clutch arm 63 a driving pawl 64 is pivoted as at 65. Pawl 64 has a lever arm 66 to which a spring 67 is connected, the other end of said spring being fastened to an inner portion of arm 63. Thus the spring tends to rotate the pawl 64 in a counter-clockwise direction in the figures so that said pawl tends to engage the internal teeth 68 of a ring gear 69 driven at constant speed from an electric motor 70 (Fig. 2) or other source of power by any desired connections (not shown).

A disengaging arm 71 is also fastened to pawl member 64 and as the clutch arm 63 rotates in the direction of the arrow in Fig. 5, this disengaging arm 71 will strike the end of a blocking lever 72 so that the pawl 64 will be rotated in a clockwise direction against the action of spring 67 to disengage the pawl from the gear teeth 68. Thus, each time disengaging arm 71 strikes the blocking lever 72 the pawl will be disengaged from the teeth 68 of the driving gear and the clutch arm 63 and its shaft 62 will be stopped.

Blocking lever 72 is pivoted at 73 to a frame member and carries an actuating arm 74. A link 75 is pivotally connected to the arm 74 and to one end of a lever 76 which is pivoted at 77 to a suitable supporting or frame member. The other end 78 of lever 76 is pivotally connected to a link 79 which in turn is pivoted to the core 81 of a suitable solenoid 82. A spring 83 is fastened at one end to lever arm 78 and at the other end to a frame member 84 and tends to pull the solenoid core downwardly and maintain the various levers in the position shown in Fig. 5. The solenoid 82, on the other hand, tends to raise the end 78 of lever 76 whenever said solenoid is actuated and thereby rotates blocking lever 72 out of the path of disengaging arm 71.

In other words, whenever the solenoid 82 is not actuated, spring 83 will hold the parts in the position of Fig. 5 so that blocking lever 72 engages the throw-out arm 71 to disengage pawl 64 as the clutch arm 63 reaches the position of Fig. 5.

The solenoid 82 is actuated by electric current carried through wires 87 and 88. Wire 87 may be connected directly to one current supply line while wire 88 is connected to a suitable switch 89. The other terminal of switch 89 is in turn connected by a wire 90 to the other end of the electric supply line. Thus, whenever switch 89 is closed, the solenoid 82 will be actuated.

To actuate switch 89 a lever arm 92 is provided. Lever 92 is carried by a rotatable shaft 93 mounted in a frame member 94. A spring 95 tends to urge actuating arm 92 into engagement with the switch in order to close the switch and actuate solenoid 82. Lever 92 is further provided with a feeler arm 96, the outer end 97 of which is urged upwardly into the path of the blank 35 which is being fed. As long as a portion of the blank is passing over the end 97 of the feeler arm 96, the switch-actuating arm 92 will be held in the position of Fig. 5 with the switch open and the solenoid 82 unactuated.

However, as the end of each blank 35 passes beyond the end 97, the feeler arm 96 and actuating arm 92 are permitted to rotate slightly in a clockwise direction to actuate switch 89 and thereby activate the solenoid 82. Thus, the arm 96 and switch 89 will actuate the solenoid 82 just at the instant that the rear end of each blank 35 passes beyond the end 97 of the feeler. When the solenoid is actuated, its core 81 will be pulled upwardly against the action of spring 83 so that blocking lever 72 is rotated in a counter-clockwise direction as described above, out of the path of throw-out arm 71. The disengagement of the blocking lever 72 will thus permit spring 67 to rotate the pawl 64 into engagement with the teeth 68 of the constantly moving driving gear so that clutch arm 63 and shaft 62 will be driven with driving gear 69 for one complete revolution. This rotation of shaft 62 will cause one of the pushers 48 to feed another blank from the bottom of the stack and the forward edge of this blank will promptly engage the end 97 of the feeler arm 96 to depress said arm and open the switch 89. Thus, the solenoid 82 will be de-activated and spring 83 will return blocking lever 72 to the position of Fig. 5 where it will engage the throw-out arm 71 as the clutch arm 63 and shaft 62 complete their first revolution. As successive blanks are fed, the cycle will be repeated.

It will be noted that the feeding chains 47 do not extend throughout the full length of the stack of blanks 35. In the device shown it is only necessary that the bottom blank be pushed far enough from the stack by means of chains 47 and pushers 48 so that the forward edge of said blank will pass between the feed rollers 98 and 99. These rollers are constantly driven and will serve to pull the blank the rest of the way from the stack after the pusher 48 has started the blank on its way and forced said blank into engagement with the feed rollers. These rollers 98 and 99 are mounted on shafts 101 and 102 respectively. An additional pair of feed rollers 103 and 104 are carried by shafts 105 and 106 respectively. The four shafts of these feed rollers may be interconnected as shown in Fig. 2. Thus, shafts 101 and 102 carry intermeshing gears 107 and 108 respectively. Similarly, shafts 105 and 106 are provided with interlocking gears 109 and 110. An intermediate gear 111 carried by an idler shaft 112 meshes with both of the gears 108 and 110 so that all the feed roller shafts rotate together. One of these shafts, for example shaft 102, is connected to the source of power 70 by any desired means (not shown).

From the foregoing description of the feeding mechanism it will be apparent that the feed rollers 98, 99, 103, and 104 and the driving gear 69 will be driven constantly by the motor 70. The feeding chains 47 with their pushers 48 will be actuated intermittently by means of the one-revolution clutch and the feeler or control arm 96 so that blanks will be fed successively from the bottom of the stack in spaced relation. By suitable adjustment of the various parts, any desired spacing between successive blanks may be achieved. The amount of spacing utilized for the present purpose is of the order of two inches, although this spacing may be changed without departure from the essential spirit of the invention.

*Glue-applying mechanism*

After each blank 35 passes through the feeding rollers 103 and 104, it will next be moved beneath the glue-applying roller 114 and between said roller and a cooperating feed roller 115. These rollers and their operating mechanism are shown in detail in Figs. 2, 6, and 7. The rollers are supported on driven shafts 116 and 117 respectively. Shaft 117 is mounted in fixed bearings in the main frame and may be connected in any suitable manner (not shown) to the driving motor 70 or to one of the power-actuated shafts such as shaft 106 of the feeding section.

As shown in Fig. 1, the glue-applying roller 114 is not solid but consists of a series of spaced disks which are adapted to apply the glue or adhesive in stripes 41 on the upper surface of each blank 35. Shaft 116, on which the glue-applying roller 114 is mounted, is journaled in the lower end of pivoted bearing arms 118, one of which is positioned at each side of the machine. For convenience, only the bearings and supports at one side of the machine will be described. Bearing arms 118 are in turn pivoted at 119 to a movable supporting frame 121. This frame 121 is pivoted at 122 to the main frame of the machine. The weight of the frame and of the roller and associated driving mechanism is so located with reference to pivot 122 that the roller 114 is normally urged into contact with the top face of a blank 35 due to the action of gravity. Suitable stop means may be provided to prevent roller 114 from dropping into actual contact with roller 115 when there is no blank in position. This stop means includes an adjustable stop screw 120 threaded into a projection 130 on the end of frame 121. The lower end of this screw engages the top of a horizontal stop plate 139 bolted to the main frame. Thus roller 114 will be held away from roller 115 a distance slightly less than the thickness of blanks 35 so that roller 115 will not become coated with adhesive but will remain entirely clean.

The bearing arm 118 has an upward extension 123 through which an eye bolt 124 is loosely engaged. Thus, the end 123 of bearing 118 is free to move longitudinally of the eye bolt 124. A stop or lock nut 125 at the outer end of the eye bolt 124 serves as a blocking means to limit the movement of the bearing arm to the right in Fig. 6. The other end of eye bolt 124 is rotatably journaled on a shaft 127 which is in turn mounted on the auxiliary frame 121. A suitable spring 126 which is interposed between the arm 123 and shaft 127 serves to urge the arms 118 and 123 to rotate about their pivot 119 in a clockwise direction, so as to maintain the glue-applying roller 114 in operative contact with a suitable feed roller 128. This feed roller is carried by a shaft 129 journaled in fixed bearings on auxiliary frame 121.

Additional bearing arms 131 are also journaled at one end on shaft 127. The other end of arms 131 serve as bearings for a shaft 132 on which is mounted an auxiliary feed roller 133. A projection 134 on the pivoted bearing arm 131 is provided with a threaded opening in which an adjusting screw 135 is mounted. This adjusting screw 135 engages an abutment 136 on auxiliary frame 121 to determine the lowermost position of the shaft 132 and auxiliary feed roll 133. Because of the arrangement of the parts, the force of gravity tends to urge the shaft 132 and roller 133 downwardly toward the main feed roll 128. By adjustment of the knob 137 on screw 135 the spacing between the main and auxiliary feed rollers 128 and 133 may be suitably adjusted so that a film of adhesive of the desired thickness will be carried by the main feed roll.

The adhesive is supplied to the space 138 just above the nip of the two feed rolls through a supply pipe 140 connected to a pump 141. This pump 141 is driven by a separate motor 142 by means of a belt 143 and pulley 144. The inlet of the pump 141 is connected by a pipe 145 to a suitable reservoir or tank 146 which serves as a source of supply for the adhesive.

The surplus adhesive which does not pass between the feed rolls as a coating on said rolls will overflow the ends of the feed rolls and drop into the trough-like bottom 147 of the auxiliary frame 121. From this trough 147 the excess adhesive may flow through side openings 148 and into pipes or spouts 149 which return the adhesive to the supply tank 146. Thus operation of the pump 141 circulates the adhesive constantly from the tank up to the space 138 above the rolls and the action of gravity carries the surplus adhesive back to the supply tank so that the adhesive continues to flow at all times and is prevented from drying on the various parts.

The driving connections for the glue-applying roll and feed rolls may be of any desired form. As shown in Fig. 2, it is contemplated that the shaft 129 of main feed roll 128 will be suitably connected by a gear 151 to a similar intermeshing gear 152 on shaft 132 of the auxiliary feed roll 133. Thus, these two rolls will rotate in opposite directions so that their adjacent peripheral surfaces are moving in the same direction to carry a limited amount of adhesive through the space at the nip of the rolls and thereby coat the main feed roll with a thin layer of the adhesive which it can pass on in turn to the glue-applying roll 114.

A further gear 153 is affixed to main feed roll shaft 129 and this gear drives a cooperating idler gear 154 mounted on a shaft 155 journaled in the auxiliary frame 121. Idler gear 154 in turn meshes with the gear 156 on shaft 116 of the glue-applying roll.

The use of the intermediate idler gear causes the shaft 116 to rotate in the same direction as the shaft 129 so that the peripheral surface of the glue-applying roller 114 will move in a direction opposite to that in which the meeting surface of the feed roll 128 is moving. Thus the glue-applying roll 114 will wipe the adhesive layer from the main feed roll 128 and will carry this adhesive downwardly to the blank 35. Here again, the direction of rotation is such that the surface of glue-applying roll 114 is moving in the opposite direction from the direction of movement of blank 35. Thus the blank 35 will effectively wipe the glue from the glue-applying roller 114 so that the blank will receive the glue in the form of longitudinal stripes (shown in Fig. 1).

Safety mechanism has been provided to stop the application of glue by the glue-applying roller 114 to the blanks 35 in the event that the supply of lining material 42 (see Figs. 1, 2, and 7) is interrupted for any reason. Obviously, if there is no lining material in position for application to the blanks by the succeeding laminating section, the presence of the stripes of adhesive on the upper surface of blanks 35 would cause the pressure rollers of the laminating and succeeding sections to become sticky and dirty. To prevent such a situation, a mechanism has been provided which will lift the auxiliary frame 121 and glue-applying roller 114 upwardly away from the feed roller 115 and the blanks 35 so that no further adhesive will be deposited upon the blanks. This separation of the glue-applying roller from the blanks makes it unnecessary to stop the rotation of the various shafts in the glue-applying section and thus it is possible to keep the adhesive flowing and keep the rollers in rotation so that the adhesive has no opportunity to dry and clog the working parts of the machine.

To lift the auxiliary frame about its pivot 122 a link 158 is pivoted at 159 to the opposite end of frame 121 from said pivot. This link 158 includes an adjustable turnbuckle portion 160 which permits easy adjustment of the extent of separation of the parts. The upper end of link 158 is pivoted at 161 to a short lever arm 162 connected to shaft 163. Shaft 163 is supported in suitable bearings in the main frame of the machine. A longer lever arm 164 is likewise connected to shaft 163 and extends in the opposite direction from lever arm 162. The outer end of this long actuating arm 164 is connected to the core 166 of a suitable solenoid 167 by means of a link 165 pivoted to the lever and core.

Figures 6, 7, 8:
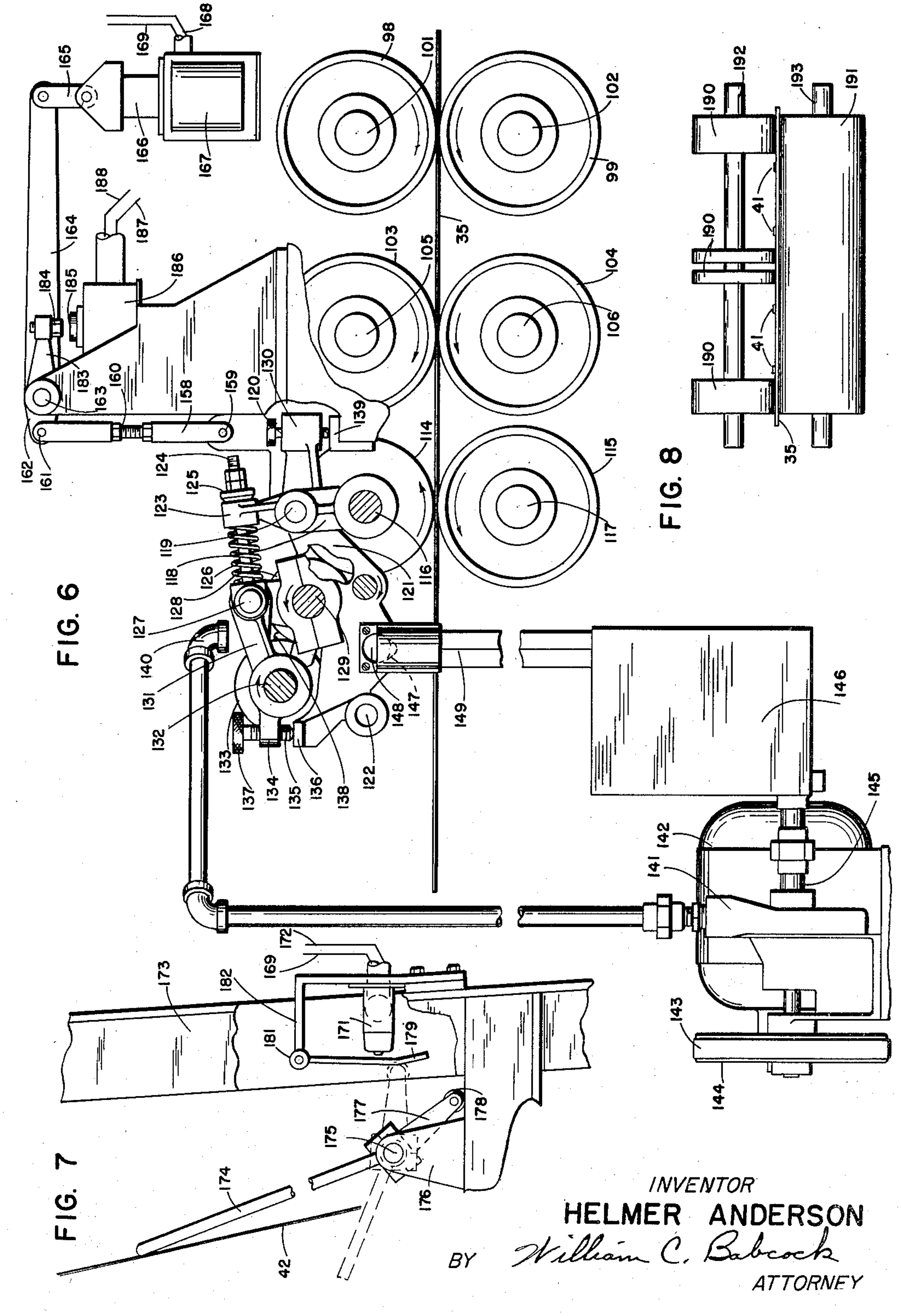
Fig. 6 is a partial elevation of the adhesive-applying section of the machine.
Fig. 7 is a partial view of part of the control mechanism for the adhesive-applying section.
Fig. 8 is a partial sectional view of the machine taken on the line 8—8 of Fig. 2.

The solenoid 167 is actuated whenever current passes through wires 168 and 169 which are connected to it. As shown in Fig. 6 the solenoid is in its rest or inactive position. In this position the auxiliary frame 121 is rotated clockwise under the action of gravity so that the glue-applying roller 114 may engage the top surface of the blank 35. When current is passed through wires 168 and 169 to actuate the solenoid 167 the core 166 will be pulled downwardly. This movement will be transmitted by means of the actuating arm 164 to shaft 163 and lever arm 162. The latter lever will therefore move upwardly and through the link 158 will lift the end of auxiliary frame 121 so as to rotate said frame in a counter-clockwise direction about its pivot 122 and thus separate the glue-applying roller from the blank 35.

To control the solenoid 167 a suitable switch 171 has been mounted on one of the upper main frame members 173 which serves to support the supply roll 43 of lining material. Any desired circuit between switch 171 and solenoid 167 may be employed. For example, wire 168 from the solenoid may be connected directly to one of the usual pair of current supply lines. The other solenoid wire 169 may be connected to one side of switch 171 while the other side of the switch is connected by wire 172 to the other supply line.

A feeler arm 174 pivotally mounted at 175 to a suitable supporting bracket 176 on the frame is positioned to engage the strip 42 of lining material at a point between the supply spool 43 and the rollers of the laminating section. Normally the lining material 42 is under sufficient tension between these points so that it holds the feeler arm 174 in the heavy line position shown in Fig. 7. Should the lining material break, the arm 174 will drop to the dotted line position of Fig. 7. It will be noted that the lever arm 174 is integrally connected to a short switch-actuating arm 177 which carries a cam roller 178. As the feeler 174 drops to the dotted line position of Fig. 7 this roller 178 will engage the lower end of a switch-actuating lever 179 which is pivoted at 181 to a supporting bracket 182 fastened to the frame member 173. As the roller engages the lever 179 the latter will be forced to the right in the figure to actuate switch 171 and thus actuate the solenoid 167. The solenoid will then lift the glue-applying roller 114 as described above so that no additional adhesive will be applied to the blanks 35 until the supply of lining material 42 is repaired or replenished.

In order to avoid feeding additional blanks 35 through the glue section to the laminating section while the supply of lining material 42 is interrupted, an additional switch mechanism has been provided as shown in Fig. 6. Thus a switch actuator arm 183 is fastened to shaft 163 so that it moves downwardly whenever the solenoid is actuated to lift the glue-applying roller. This arm 183 includes a switch actuating button 184 which may be threaded into the end of the arm so that its position may be adjusted accurately. The button 184 in turn engages the actuator 185 of a master switch 186 which is connected by wires 187 and 188 to the main driving motor 70 in such a way that actuation of switch 186 by arm 183 will stop the motor. Thus, not only is the glue-applying roller lifted when the supply of lining material 42 is interrupted, but also the driving motor for the remainder of the machine is stopped so that additional blanks will not be fed into the gluing section or to the laminating section. Furthermore, as indicated above, the rollers of the gluing section are driven from a separate source of power so that they will continue to rotate and prevent drying of the adhesive even though the balance of the machine has been stopped.

*Laminating mechanism*

After the blanks 35 have passed through the adhesive-applying section of the machine, they are next fed toward the laminating section. A group of four cooperating feed rollers is utilized to feed the blanks to a control device after which the lining material is laminated to said blanks. These preliminary feed rollers of the laminating section are in pairs similar to those shown in Fig. 8 which shows the first pair of rollers consisting of an upper roller 190 and a lower roller 191. These rollers are carried on shafts 192 and 193 respectively. The bottom feed roller 191 is an ordinary smooth roll, while the upper roller 190 consists of a number of separated narrow rolls which are adapted to engage the blank 35 at points between the longitudinal stripes of adhesive 41. Obviously, a solid upper roll would smear the adhesive and would soon become coated with particles of the adhesive. This difficulty is avoided by use of the separate narrow rolls as shown. A similar pair of feed rollers is carried on shafts 194 and 195 respectively. To connect these four rollers in driving relation, gears may be employed similar to those utilized for the initial feed rolls 98, 99, 103, and 104.

Thus intermeshing gears 196 and 197 on shafts 192 and 193 respectively serve to connect these shafts in driving relation to each other while similar gears 198 and 199 mesh with each other to connect the respective shafts 194 and 195. An intermediate gear 201 journaled in the frame 202 meshes with both the gears 197 and 199 so that all four of the feed roll shafts rotate together in the same direction.

To drive these shafts a sprocket 203 is provided on shaft 195. This sprocket is driven through a chain 204 from a driving sprocket 205 on auxiliary driving shaft 206. The customary idler sprocket 211 journaled on an arm 212 pivoted to the frame at 213 is resiliently urged against chain 204 to take up any slack in said chain.

Figure 3:
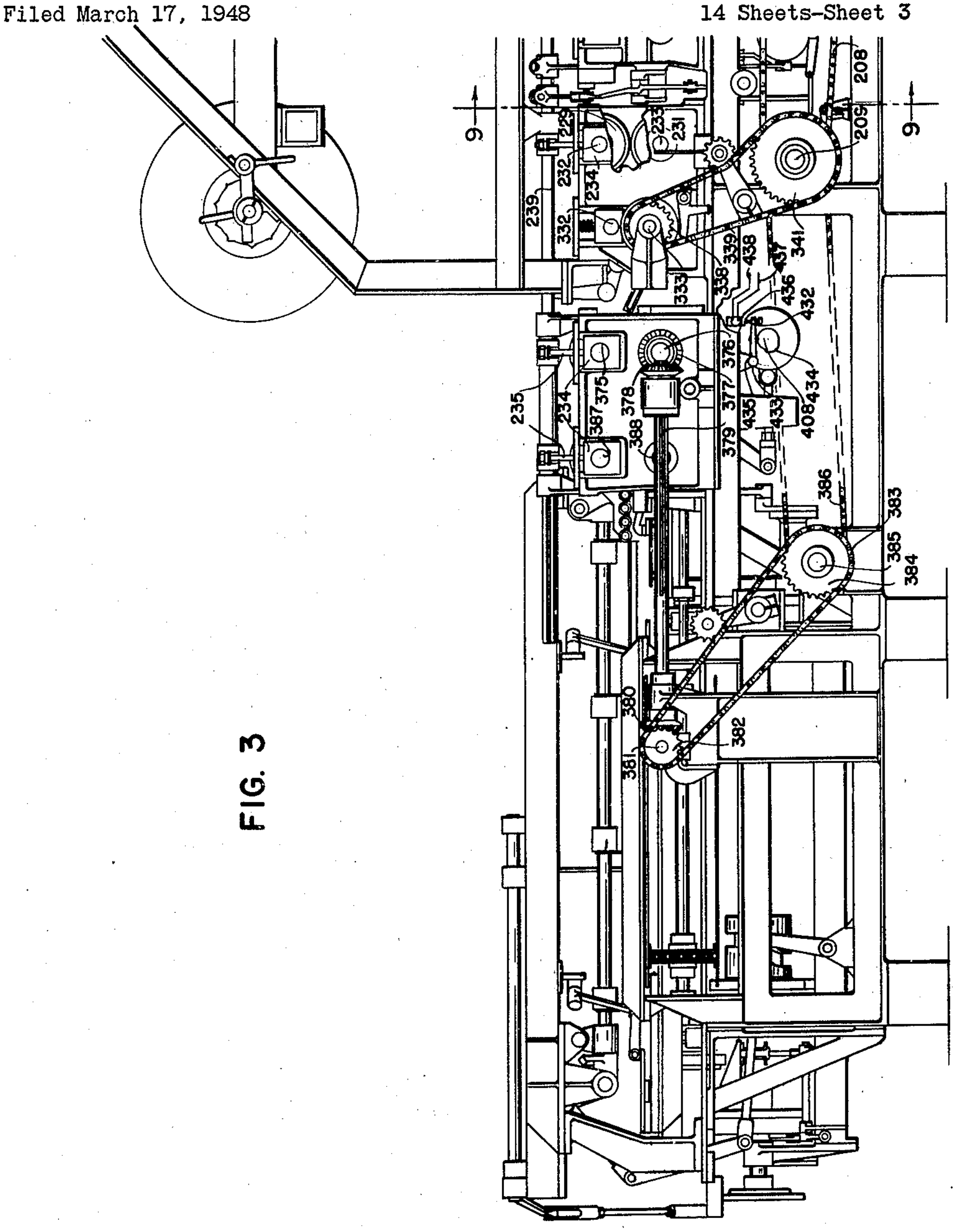
Fig. 3 is a similar side elevation showing the balance of the machine of Fig. 2.

Auxiliary drive shaft 206 in turn carries a sprocket 207 which is driven by a chain 208 from a sprocket (not shown) on main drive shaft 209 (Fig. 3.) Shaft 209 is in turn connected to the driving motor 70 by any suitable means such as, for example, sprockets and chains (not shown).

Figures 9, 10:
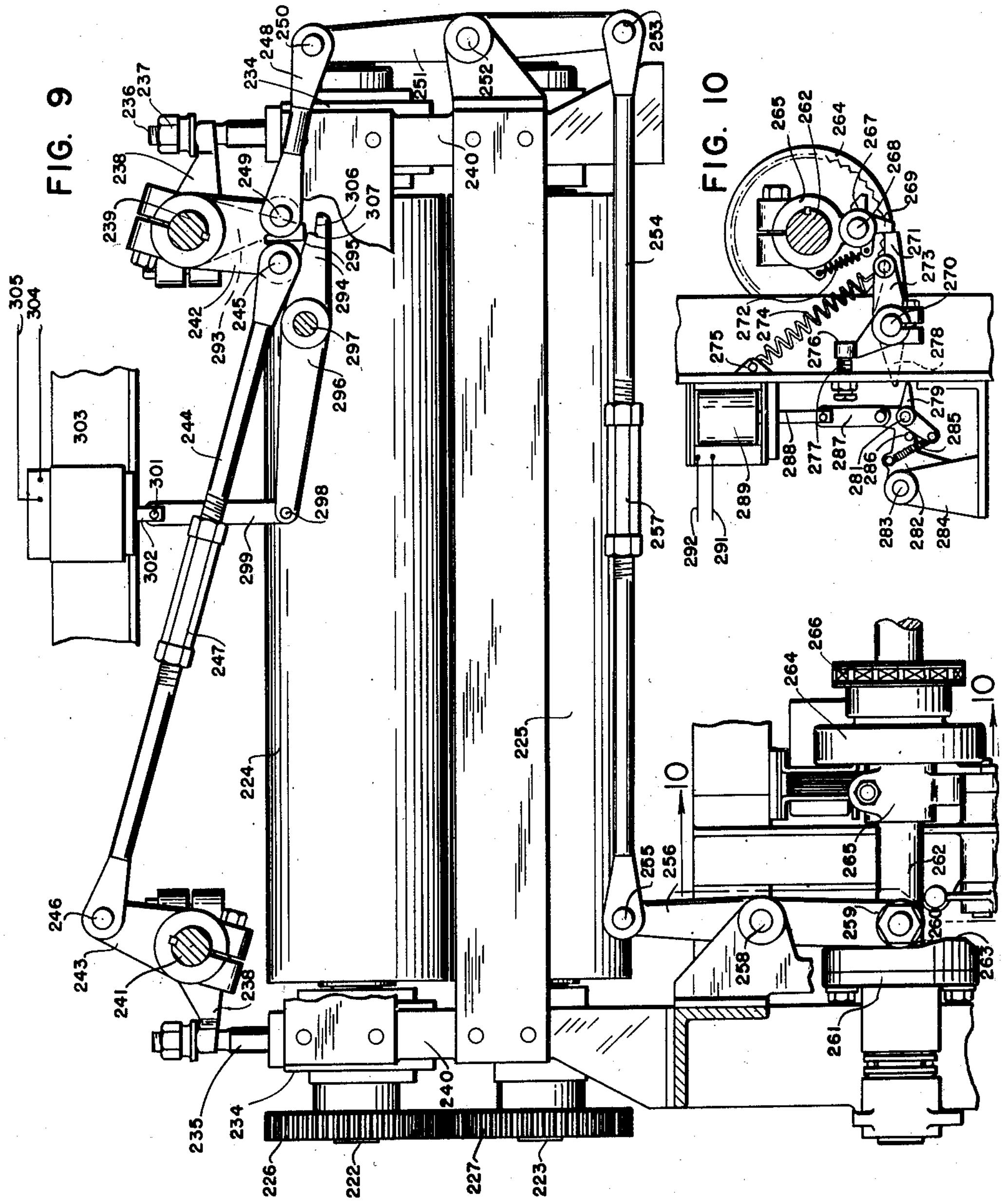
Fig. 9 is a sectional view on the line 9—9 of Fig. 3 with certain portions broken away for clearness.
Fig. 10 is a partial sectional view on the line 10—10 of Fig. 9.

As the blanks 35 leave the gluing section, they will be moved by the feed rollers just described so that they pass beneath a guide 214 and over a control mechanism designated generally as 215, after which said blanks pass through the laminating rollers 217 and 218 which press the lining material 42 firmly against the upper surface of the blanks. This lining material 42 passes to the laminating rolls 217 and 218 over guide rolls 221 and 216 (Fig. 2) from a supply spool 43. There are three pairs of cooperating rolls in the laminating section which press the lining material 42 firmly against the blanks 35 so that the adhesive stripes 41 may form a firm bond between the two. The first two of these laminating rollers 217 and 218 are carried on shafts 219 and 220 respectively. Similar shafts 222 and 223 carry the next pair of laminating rolls 224 and 225 (see Fig. 9). Intermeshing gears on the respective upper and lower rolls serve to connect the rolls for rotation in opposite directions to feed and press the blanks. The intermeshing gears are similar to those previously described in connection with feed rolls 98, 99, 103, and 104 and also the feed rolls 217 and 218. Two of these gears are shown in Fig. 9, gear 226 being on the upper shaft 222 and gear 227 on the lower shaft 223 of the second pair of laminating rolls. These gears are similar to those described for the other feed rolls except that they are located on the opposite side of the machine. Similar gears on the first pair of laminating rolls 217 and 218 may be interconnected with gears 226 and 227 by an intermediate idler gear (not shown) journaled on a shaft 228 (Fig. 2).

The third and final pair of laminating rolls 229 and 231 are carried on shafts 232 and 233 respectively. Intermeshing gears of the type just described connect said rolls to each other, and the lower shaft 233 may be connected to shaft 223 by a chain and sprockets (not shown). It is contemplated that shaft 223 will be driven from one of the power shafts by a further sprocket and chain (not shown).

The upper shafts 219, 222, and 232 of the laminating section are journaled in bearings 234 which are vertically movable in the side frames 240 (see Fig. 9). A lifting rod 235 is attached to each bearing 234. Mechanism is provided to lift these rods and bearings and thereby lift the upper laminating rollers away from the lower rollers so that no feeding movement will be imparted to the laminating material 42 in the event that the supply of blanks 35 is interrupted for any reason. This mechanism is shown in Figs. 9 and 10. By reason of this safety mechanism, any waste of the laminating material due to the feeding of such material by the laminating rollers, when no blank 35 is in position between the rollers, will be avoided.

Lifting rods 235 are threaded at their upper ends 236 and adjusting nuts 237 are fastened to the threaded ends. The lower side of each adjusting nut is engaged by a lifting fork or lever 238 fastened to a shaft 239 which extends longitudinally of the machine. A similar shaft 241 at the other side of the machine carries similar lifting levers 238 for the lifting rods 235 and bearings 234 on that side of the machine. The two lifting shafts 239 and 241 are interconnected for simultaneous rotation in opposite directions as shown in Fig. 9 so that the bearings 234 at each side of the machine will be lifted simultaneously to maintain the upper shafts 219, 222, and 232 horizontal as they are lifted. Thus, a downwardly extending lever arm 242 on shaft 239 is connected to an upwardly directed lever arm 243 on shaft 241 by a connecting rod 244 which is pivoted at 245 to lever 242 and at 246 to lever 243. The central portion 247 of connecting rod 244 may be of turnbuckle construction for adjustment of the parts. A connecting link 248 is pivoted at 249 to the crank arm 242 to actuate said arm and thereby actuate shafts 239 and 241 to lift the bearing 234. This link 248 is pivoted at its other end 250 to a two-arm lever 251, the center of which is pivoted at 252 to the main frame. The lower end of lever 251 is pivotally connected at 253 to a further connecting rod 254 which extends laterally across the machine and is pivoted at its other end 255 to the upper end of a cam lever 256. A turnbuckle construction 257 on connecting rod 254 permits of adjustment of this portion of the drive mechanism.

Cam lever 256 is pivoted at 258 to one of the frame members and carries at its lower end a cam roller 259. This roller engages the flat surface 260 of a cam disc 261 fastened to driven shaft 262. A raised portion 263 on the face of the cam disc is adapted to engage the cam roller 259 when the disc 261 is rotated and move said cam roller to the right in Fig. 9. This movement will be transmitted through the linkage just described to rotate shafts 239 and 241 in a counter-clockwise direction so as to lift the bearings 234.

Shaft 262 may be driven from a constantly rotating drive gear 264 by means of a one-revolution clutch member 265. Driving gear 264 is in turn connected to the main driving mechanism of the machine through a sprocket 266 and chain.

The one-revolution clutch is similar to that described in connection with the feeding section of the machine and is shown in detail in Fig. 10. Thus, the clutch member 265 is provided with a drive pawl 267 pivoted to the member 265 at 268. Pawl 267 is adapted to engage the teeth of the driving gear 264 whenever the clutch is operated. A disengaging arm 269 is connected to the pawl 267 and is adapted to strike a blocking lever 271 which holds the pawl 267 out of engagement with gear 264 against the action of spring 272. Whenever the blocking lever 271 is moved downwardly out of the path of disengaging arm 269, the spring 272 will rotate the pawl 267 into engagement with the gear 264 so that the clutch member 265 will be driven by the gear and will rotate with it until disengaging arm 269 again strikes the blocking lever 271.

Lever 271 is carried by a shaft 270 pivoted to the frame of the machine. The lever and shaft turn as a unit. A crank arm 273 is integrally connected to the shaft 270 and is urged in a counter-clockwise direction by a spring 274 fastened to a frame bracket 275. Shaft 270 likewise carries a stop arm 276 which is urged against the stop screw 277 in the frame by the action of spring 274. In this position blocking lever 271 is in position to intercept the disengaging arm 269 of pawl 267.

A tripping arm 278 is likewise connected to shaft 270 and is positioned in the path of a tripping pawl 279 pivoted at 281 to a crank arm 282. Crank 282 in turn is pivoted at 283 to a frame bracket 284.

Pawl 279 is urged in a clockwise direction against a stop 286 by spring 285. In this position the pawl will engage the tripping arm 278 and raise said arm whenever the crank 282 is lifted. Such engagement will rotate shaft 270 to move the blocking lever 271 out of the path of the clutch arm 269.

In order to lift the crank 282 said crank arm is connected by a link 287 to the core 288 of a solenoid 289. Wires 291 and 292 carry current to the solenoid and are connected in circuit with a suitable control device to be described. Thus whenever the solenoid is energized the crank 282 will be raised and tripping pawl 279 will engage and move the tripping arm 278. When the solenoid is de-energized, its core 288 and crank arm 282 will drop. During the downward movement of arm 282, the tripping pawl 279 will engage the top of lever 278 and will be rotated counter-clockwise against the resilience of spring 285 to permit the pawl to pass arm 278 and resume its initial position below said arm.

By reason of the mechanism just described, actuation of solenoid 289 will trip the one-revolution clutch to cause rotation of cam 261. This in turn will rotate shafts 239 and 241 to lift the upper bearings 234 and their shafts and rollers. To retain the bearings in their upper position a latch arm 293 is provided on shaft 239. The lower end 294 of this arm 293 normally rides on the top 295 of one end of a latch member 296. Member 296 is pivoted at 297 to the frame and is connected at its other end 298 by means of a link 299 to the core 302 of a solenoid 303. The usual pivotal connection 301 is provided between link 299 and core 302. Wires 304 and 305 are also conected to the control device 215 to actuate the solenoid when desired. As long as the solenoid is de-energized its core 302 will tend to drop under the action of gravity so that the end 295 of latch 296 will be urged in an upward direction. Thus, whenever the solenoid 289 is tripped to cause rotation of shaft 239 and lifting of bearings 234, the end 294 of latch arm 293 will move to the right opposite a notch 306 in the end of lever 296. Because of the presence of this notch 306, lever 296 will immediately rotate under the influence of gravity so that the bottom surface of the notch 306 engages the lower end 294 of the lever 293 and so that locking shoulder 307 of the notch 306 holds the end 294 of lever 293 in its new position and thus retains the bearings 234 in their raised position. The bearings will remain in this position until the latch is released by actuation of solenoid 303.

Figures 11, 12, 13:
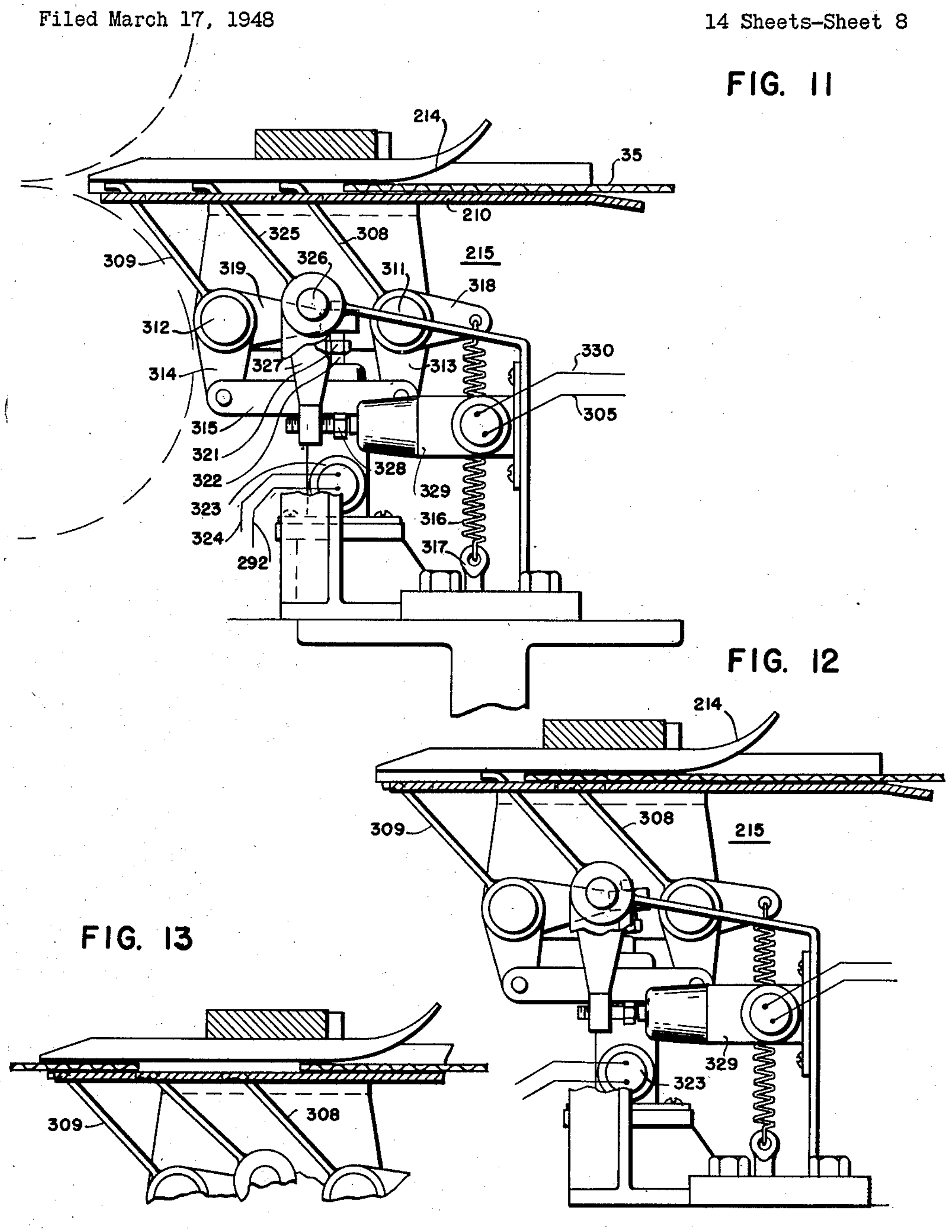
Fig. 11 is an enlarged side view of a portion of the control means for the laminating section.
Fig. 12 is a view similar to Fig. 11 with the parts in a different operative position.
Fig. 13 is a partial view similar to Figs. 11 and 12 with the parts in still another operating position.

In Figs. 11, 12, and 13 the details of the control mechanism 215 are shown. As indicated in Fig. 11, the blanks 35 are fed beneath the guide 214 and above a supporting surface 210. Positioned in the path of the blank 35 are a number of control members. Two of these members 308 and 309 are pivoted respectively at 311 and 312 to the frame. These members or feelers 308 and 309 are spaced apart a distance slightly greater than the normal spacing between the blanks 35 as said blanks are fed from the previous sections of the machine. Feelers 308 and 309 are provided with corresponding crank arms 313 and 314 which are connected by a link 315 so that the arms move together as a unit. A spring 316 connected to the frame at 317 and to another crank arm 318 on control arm 308 tends to rotate the control members 308 and 309 so that their upper ends are forced upwardly against the bottom of guide member 214. These arms can be depressed or rotated in a counter-clockwise direction against the action of spring 316 whenever either one of the arms is engaged by a portion of a blank 35. A switch-actuating arm 319 connected to control arm 309 carries an adjustable actuating screw 321 which is adapted to engage the control button 322 of switch 323. This switch 323 is connected in circuit with solenoid 289 by means of wires 292 and 324. Thus, wire 292 may connect one side of the switch to the solenoid while wires 291 and 324 connect the other terminals of the solenoid and switch to a suitable source of current.

The arrangement of switch 323 is such that whenever the control arms 308 and 309 are in the position of Fig. 11, the solenoid 289 will be energized to lift the bearings 234. This action will take place when there is no blank 35 in position to depress either of the arms 308 and 309. During normal operation of the machine, both arms 308 and 309 will be held in a depressed position either by the engagement of the leading end of a blank with arm 308 (Fig. 12) or by engagement of the trailing end of such blank with arm 309 (Fig. 13). However, if the supply of blanks is interrupted or the space between them is greater than that for which the control device 215 is designed, both control arms 308 and 309 will be permitted to rotate upwardly so that the lifting mechanism for the rollers will be actuated.

To control the solenoid 303 which releases the latch 296 for the lifting mechanism a third control arm 325 is provided. This control arm is positioned between arms 308 and 309 and is pivoted to the frame at 326. Control member 325 includes a lever arm 327 which carries an adjustable actuating screw 328 for engagement with a further switch 329. Resilient means (not shown) urges the arm 325 upwardly just as in the case of control members 308 and 309, so that switch 329 is in its open position whenever there is no blank 35 in position to depress the arm 325. Depression of the control arm 325 will actuate switch 329 to energize solenoid 303 by means of wires 305 and 330. Thus, wire 305 connects one side of the switch 329 to one terminal of solenoid 303 while wires 304 and 330 connect the other terminals of the solenoid and switch to a source of current.

From this description it follows that the presence of a blank 35 above control member 325 will energize solenoid 303 to hold latch member 296 in disengaged position so that it will either release the lifting mchanism and permit the rollers to drop or will fail to latch the lifting mechanism in its upper position in case said mechanism is inadvertently tripped while there is a blank approaching the laminating section.

In the situation shown in Fig. 11 where there is no blank engaging any of the three control members, the lifting mechanism will be actuated to raise the bearings 234 and the upper laminating rollers so that the rollers will not pinch the laminating material 42 against the cooperating lower rollers and thus will not impart feeding movement to such material or to the blanks 35. The solenoid 303 is de-energized at this time so that the latch 296 holds the mechanism in the lifted position. As blank 35 reaches the position of Fig. 12 it engages arm 308 and thus depresses said arm to open the switch 323 and de-energizes solenoid 289. Further movement of blank 35 will depress the intermediate control arm 325 and thus actuate switch 329 to energize solenoid 303 and release latch 296. The bearings 234 will then be permitted to drop so that the upper rollers will be urged under the influence of gravity against the lower rollers and will feed the laminating material and also the bank.

As the rear end of a blank reaches the control arm 325 said arm will rotate upwardly to open switch 329 and de-energize solenoid 303. Thus the latch 296 will again be free to hold the parts in lifted position but will not be effective for this purpose unless the absence of a succeeding blank permits both the control arms 308 and 309 to move upwardly and actuate the lifting mechanism.

*Cutting mechanism*

Figures 14, 16:
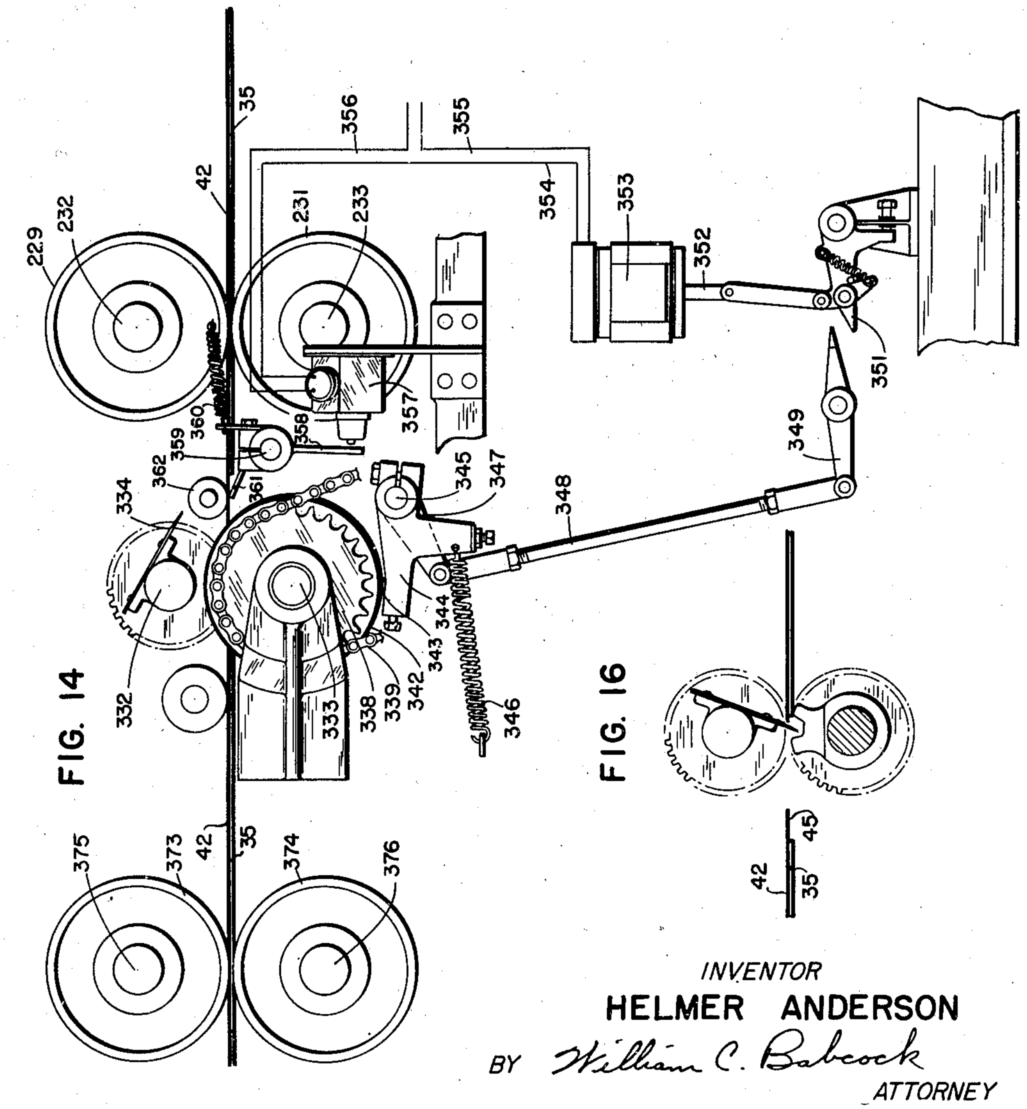
Fig. 14 is an enlarged partial side elevation of the cutting section of the machine showing details of the control mechanism.
Fig. 16 is a view similar to Fig. 15 but with the cutting knife in operative position with respect to the material being cut.

The mechanism for cutting the laminating material between the successive blanks is shown in Figs. 3 and 14 to 17, inclusive. With particular reference to Fig. 14 it will be noted that the blanks and laminating material leave the final pair of laminating rolls 229 and 231 with the laminating material still in the form of a continuous sheet and with the blanks separated by the predetermined spacing. Thus there is a thin section consisting solely of the laminating material which extends between the successive blanks 35 and effectively joins said blanks together.

The cutting section is designed to sever the laminating material close to the leading edge of each blank so that a section 45 (Fig. 16) of the laminating material will extend rearwardly from the trailing edge of each blank to serve as an overlapping internal seal when the blank is finally folded into box form. Shafts 332 and 333 journaled in the main frame carry the cooperating cutting members. Thus, with reference to Fig. 15 shaft 332 carries a suitable cutting knife 334. Shaft 333 carries a cooperating recessed cutting anvil 335, the recess being designed to permit penetration of the knife edge through the laminating material while the material is held on the upper edges of member 335 adjacent the recess.

Shafts 332 and 333 may be interconnected by means of gears 336 and 337 on the respective shafts. These gears intermesh and serve to drive the knife and anvil in cooperating fashion.

Figure 15:
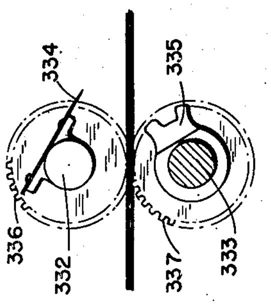
Fig. 15 is a view showing details of the cutting mechanism of Fig. 14.

Normally, shafts 332 and 333 will be at rest in substantially the position of Figs. 14 and 15. In order to rotate the shafts periodically in proper timed relation to the passage of the blanks so that the knife will cut the material as shown in Fig. 16, a driving sprocket 338 is loosely mounted on shaft 333. This sprocket is connected by a chain 339 to a further sprocket 341 on main drive shaft 209. Since the main drive shaft is rotating continuously when the motor 70 is in operation, the sprocket 338 will likewise be driven continuously. Connected to the sprocket 338 is the driving gear 342 of a one-revolution clutch whose construction is substantially similar to that of the clutches already described. A blocking projection 343 on lever 344 controls the operation of the clutch. Lever 344 is connected to a shaft 345 pivotally mounted in the frame of the machine. Shaft 345 and lever 344 are urged in a clockwise direction by spring 346 so that the blocking projection 343 normally holds the clutch disengaged and permits the gear 342 to rotate freely without driving shaft 333.

A crank arm 347 fastened to shaft 345 is connected to tripping lever 349 by a connecting rod 348. Lever 349 is actuated by a tripping pawl 351 connected by suitable links to the core 352 of a solenoid 353. Thus, whenever the solenoid 353 is energized pawl 351 will rotate lever 349 counter-clockwise and will thus rotate shaft 345 so that the blocking projection 343 moves out of engagement with the usual clutch pawl and permits the pawl to connect gear 342 and shaft 333 for one revolution.

The solenoid is connected in circuit with a switch 357 by means of wires 354, 355, and 356. Switch 357 in turn is operated by an actuating lever 358 pivoted at 359 in the frame. A spring 360 tends to hold the lever 358 out of engagement with the switch and tends to urge a feeler arm 361, which extends from lever 358, upwardly against an idling roller 362.

As the leading edge of each blank 35 strikes the feeler arm 361 it depresses said arm and rotates lever 358 against the action of spring 360 and thus actuates switch 357 to energize the solenoid 353 and engage the clutch. By suitable adjustment of the rest position of the knife blade and of the distance between the feeler 361 and the line joining the axes of the cutting-member shafts, any desired timing may be obtained. Thus the parts can be adjusted so that the knife will cut the laminating material just ahead of the forward edge of each blank 35.

Figure 17:
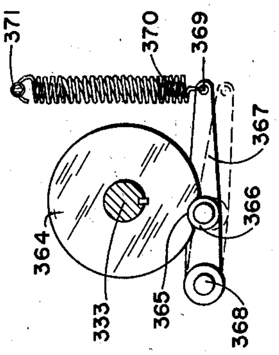
Fig. 17 is a view of a brake device utilized in connection with the mechanism of Fig. 14.

A standard shaft-positioning mechanism is provided as shown in Fig. 17. Thus shaft 333 carries a disc 364 provided with a peripheral notch 365. A roller 366 is carried by a lever arm 367 pivoted to the frame at 368. A spring 370 is fastened at one end 369 to lever 367 and at the other end 371 to a frame member. Thus each time shaft 333 rotates, the roller 366 will drop into notch 365, thus holding it in fixed position.

In order to assist the cutting action of knife 334 and anvil 335 additional feed rollers 373 and 374 are positioned beyond the cutting members. These rolls are carried by shafts 375 and 376 respectively, said shafts being provided with intermeshing gears so that they may be driven as a unit in the manner previously described.

As shown in Fig. 3, shaft 376 has a bevel gear 377 at one end which is engaged by a similar bevel gear 378 on a splined shaft 379. Shaft 379 extends longitudinally of the machine and carries a bevel gear 380 driven by a similar gear (not shown) on shaft 381. Shaft 381 is driven from the drive shaft 385 of the slitting section by means of sprockets 382 and 384 and a chain 383. Shaft 385 in turn is connected to the main drive shaft 209 by a chain 386 engaging suitable sprockets (not shown).

One additional pair of feed rollers is carried on shafts 387 and 388 respectively. These rollers, 389 and 390 respectively, are shown, for example, in Fig. 18 which is a view from the opposite side of the machine with particular reference to the transfer mechanism to be described. These rollers are connected by intermeshing gears, and the bottom shaft 388 is operatively connected to the corresponding bottom shaft 376 of the other pair of feed rollers by a suitable chain. Thus, shafts 375, 376, 387, and 388 are driven together as a unit just as in the previous group of feed rollers.

The speed of these shafts, however, is greater than that of the previous feed rollers in order that this group of rollers may hold the laminating material under tension during the cutting operation. In other words, there is a tendency for this final group of feed rollers to pull the material away from the cutting rollers faster than it is fed to the rollers and thus the web of material is tensioned to improve the cutting action. This additional speed of feeding is obtained by suitable adjustment of the gear ratios and it serves the further purpose of increasing the spacing between the respective blanks 35 as said blanks are fed to the final slitting and folding unit. Because of this extra spacing, the blanks may be moved intermittently through the latter unit at right angles to the original direction of feed without interruption of the continuous movement of the blanks through the earlier sections of the machine.

*Transfer mechanism*

Figures 18, 19, 20, 21:
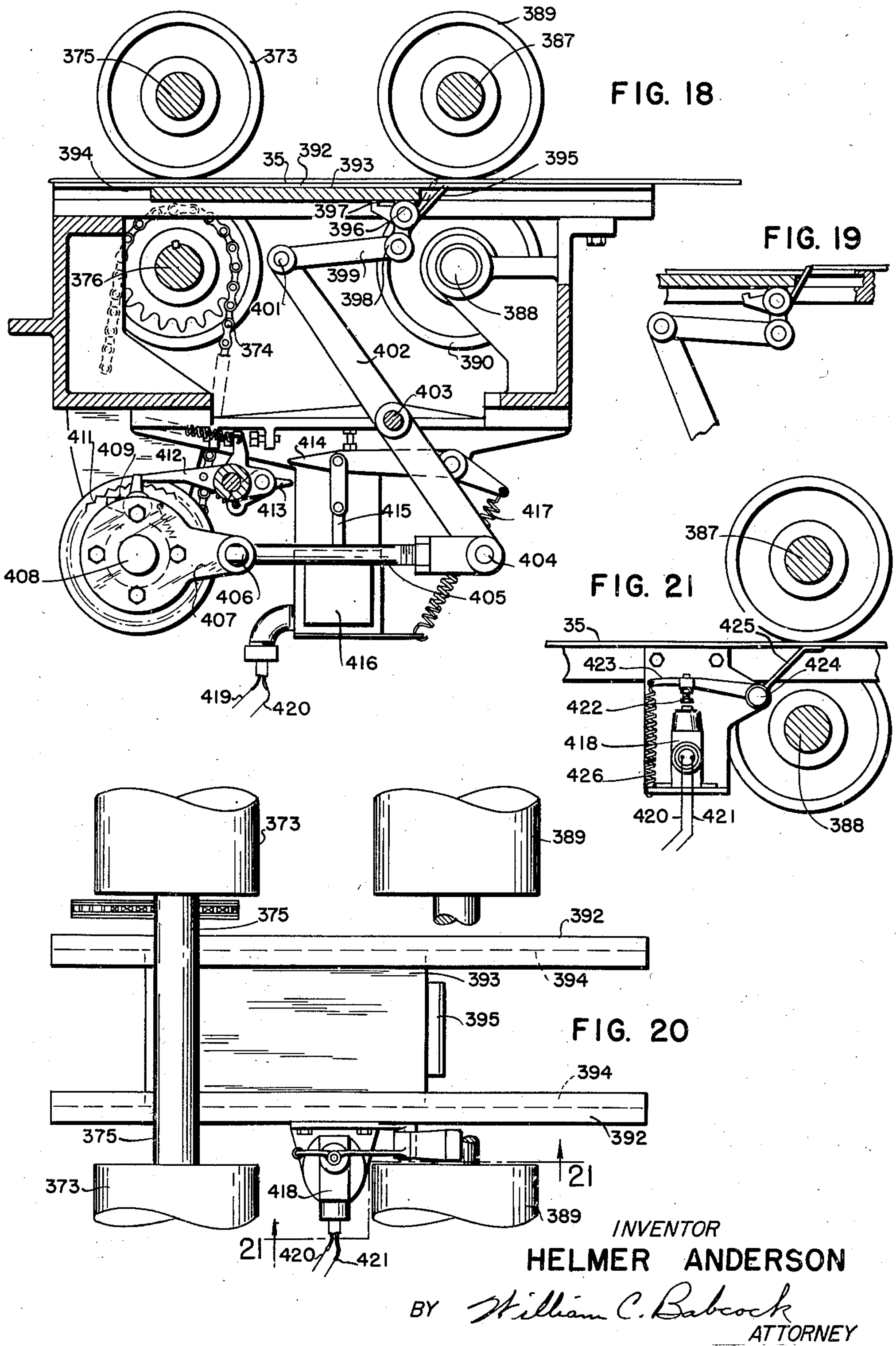
Fig. 18 is a partial side view of the feeding and transfer mechanism which removes the blanks from the cutting section, taken from the opposite side of the machine from the preceding figures.
Fig. 19 is a partial view of the pushing mechanism of Fig. 18.
Fig. 20 is a partial top plan of the device of Fig. 18 illustrating details of the control mechanism.
Fig. 21 is a partial sectional view on the line 21—21 of Fig. 20.

The mechanism which trasfers the lined blanks 35 from the final pair of feed rolls 389 and 390 to the bed of the slitting section is best shown in Figs. 3 and 18 through 21. With reference to Figs. 18 and 19, it will be noted that the rollers 373, 374, 389, and 390 are not solid but have a blank central portion which provides space for longitudinal guide rails 392. A reciprocating pusher plate 393 is slidable in channels 394 in said guides. Underneath the forward edge of this sliding pusher plate 393 a pivoted pusher plate 395 is pivoted to a shaft 396. Said shaft is fastened to brackets on plate 393. Plate 395 has a rearwardly extending projection 397 which engages the bottom surface of plate 393 to limit the relative clockwise rotation of the pusher plate 395 with respect to said plate.

A crank arm 398, likewise fastened to the pivoted pusher plate 395, is connected by a link 399 to one end 401 of a pivoted actuating lever 402. This lever is pivoted at 403 to the frame. Its other end 404 is pivotally connected to an actuating rod 405 which in turn is pivoted at 406 to an intermittently actuated crank arm 407. Crank arm 407 is fastened to shaft 408 which is journaled in the main frame. A one-revolution clutch pawl 409 is likewise fastened to shaft 408 and serves to connect the shaft in driving engagement with the driving gear 411 whenever blocking lever 412 is moved to release the clutch pawl 409.

Driving gear 411 is loosely mounted for rotation on shaft 408 and is driven by means of a suitable sprocket and chain connection from one of the main drive shafts. This connection is omitted from the drawing for clearness.

Blocking lever 412 is moved out of engagement to trip the clutch 409 whenever tripping pawl 413 is pushed downwardly by tripping lever 414. This tripping lever 414 is linked to the core 415 of a solenoid 416. Spring 417 normally holds the tripping lever in its upper or raised position when the solenoid is de-energized. When the solenoid is energized, however, the tripping lever 414 is pulled downwardly against the action of spring 417 to trip the clutch mechanism in the manner previously described and permit shaft 408 and crank arm 407 to make one revolution.

In the course of this revolution (which is in the direction of the arrow in Fig. 18) the plate 393 will be reciprocated to the right with reference to the figure and will then be returned to the position shown in the drawing.

Figure 4:
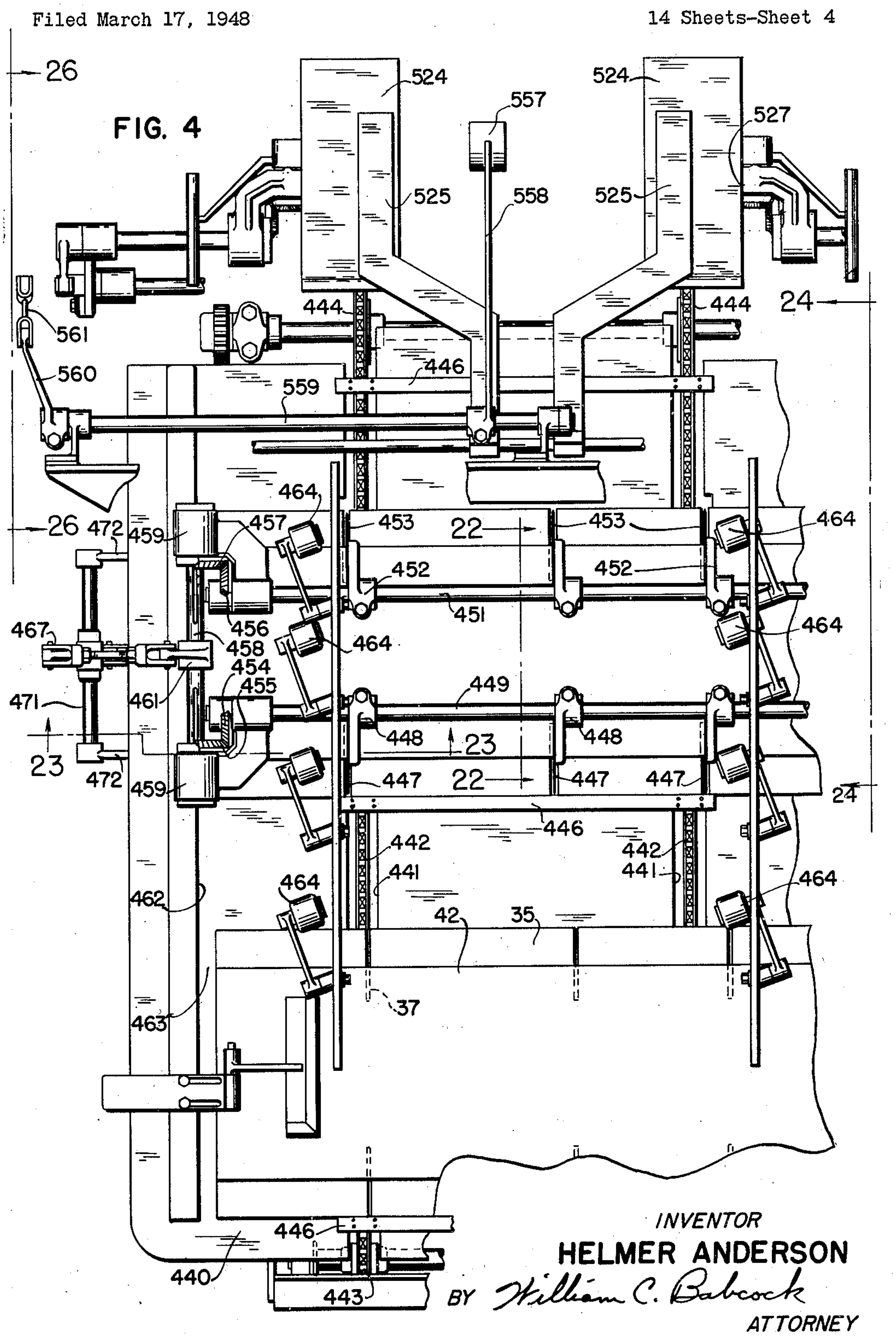
Fig. 4 is a partial top plan of the final slitting and folding section of the machine of Figs. 2 and 3.

The solenoid is designed to be actuated just as the rear end of a given blank passes through the final feed rollers 389 and 390. As the blank passes these rollers the pivoted plate 395 will be permitted to tilt upwardly from the position of Fig. 18 to the position of Fig. 19 and will thus be in a position to engage the rear edge of the blank 35 and push it all the way onto the bed of the slitting section substantially as shown in Fig. 4. Since lever arm 398 is integrally connected to pivoted plate 395 the operation of the linkage as the clutch is tripped will obviously tend to rotate the plate 395 up to the position of Fig. 19. Similarly on the return stroke of the operating lever 402 the crank arm 398 will be pulled in a clockwise direction and will tend to retract the plate 395 so that it will pass beneath the next succeeding blank as plate 393 returns to the starting position of Fig. 18.

In order to energize solenoid 416 at the proper time, this solenoid is connected to a switch 418 by means of wires 419, 420, and 421. The switch is shown in Figs. 20 and 21 from which it will be noted that switch 418 is actuated by means of an adjustable screw 422 on an actuating arm 423. This arm is pivoted to the frame at 424 and includes an integral feeler 425 which is positioned substantially along the line joining the axes of shafts 387 and 388. A spring 426 tends to rotate the control arm so that the feeler 425 pushes upwardly and the actuating screw 422 closes the switch 418. However, as long as a blank 35 is passing through above the feeler 425, the parts will be held in the position of Fig. 21 so that the switch is open. Then as the rear edge of the blank passes beyond the feeler 425 said feeler will move upwardly and the actuating arm 423 will move downwardly to close the switch and thus actuate the solenoid to trip the clutch and operate the pusher plate 393. Thus just as the blank is released by the final feed rolls, the pusher will engage it and move it rapidly ahead onto the bed of the slitting section.

A cam 434 on shaft 408 (see Fig. 3) serves to operate a switch-actuating arm 435 which is pivoted to the main frame at 433. The other end 432 of the switch arm is adapted to actuate a switch 436 each time the cam 434 lifts the actuating lever 435. Switch 436 is connected by wires 437 and 438 to the controlling clutch of the slitting and folding unit which is described below. The location of cam 434 is so chosen that just after the pusher plate 393 has moved a blank all the way onto the bed of the slitting device the switch 436 will be actuated to release the clutch of the slitting section and move the blank which has just been received on through the slitting station. Thus the slitting section will only operate when a blank has been fed into it by pusher 393.

As shown in Fig. 3 the upper shafts 375 and 378 of the transfer mechanism are carried in vertically movable bearings 234 which are lifted by rods 235 whenever shafts 239 and 241 are rotated in the manner previously described. Thus, the upper rollers of the transfer mechanism will be raised and disengaged from the cooperating lower rollers, in the same manner as the upper laminating rollers, whenever the supply of blanks is interrupted.

*Slitting mechanism*

The mechanism for slitting the lining material after it has been laminated to the blanks is shown in Figs. 3, 4, and 22 through 31.

The blanks 35 with the layer of lining material 42 are deposited by the transfer mechanism just described on the table or bed 440 (Fig. 4) of the slitting mechanism. Slots 441 in the bed are provided to accommodate conveyor chains 442 which are adapted to convey the blanks through the stations of the slitting and folding unit. These chains 442 are mounted at one end on idler sprockets 443 and are supported and driven at the other end by drive sprockets 444 carried by drive shaft 445. The manner in which shaft 445 is driven is described below.

Pusher bars 446 are fastened to the parallel conveyor chains 442 and bars 446 engage the edge of the blanks as shown in Fig. 4 to push them from station to station in this section of the machine.

The chains 442 are driven intermittently so that the blanks are first moved from the point at which they were deposited from the transfer mechanism to a position just under the slitting knives 447 and 453. Knives 447 are carried by arms 448 fastened to a shaft 449. The arms are so mounted that they may be loosened with respect to the shaft and adjusted longitudinally of the shaft in order that they may be located at various points which will coincide with the slot locations of a particular type of blank. The knives 447 are thus adapted to slit the lining material 42 above each of the slots 37 in one edge of each of the blanks 35. Similarly, knives 453 are carried by brackets 452 mounted on a shaft 451 parallel to shaft 449. Shaft 449 carries a bevel gear segment or sector 454 at one end. This gear segment 454 is driven by a similar beveled gear section 455 keyed to a shaft 458. Similar gear segments 456 and 457 drive the shaft 451 from the other end of shaft 458. Shaft 458 is loosely journaled in brackets 459 which are a part of the mounting of shafts 449 and 451. These brackets 459 and their associated gears and shafts are slidable longitudinally, i. e., parallel to the conveyor chains 442, in order to adjust the distance between the knives of the respective shafts to correspond to blanks of different width.

Shaft 458 is provided with a crank arm 461 driven as described in detail below.

The top 440 of the slitting and folding section is provided with a longitudinally extending stop or guide 462 parallel to the conveyor chains 442. The mechanism is arranged to urge the blanks 35 firmly against this guide strip 462 in order that the blanks will be accurately located with the slots under the respective knives.

Since the blanks may not completely engage the guide 462 when they are first received from the preceding transfer mechanism but may be spaced from the guide by a distance designated as 463 in Fig. 4, I have provided rollers 464 which are mounted on lever arms whose axes are oriented at an angle rather than perpendicular to the line of movement of the conveyor chains 442. Thus, as the chains and pushers 446 move each blank from its initial position in Fig. 4 to the cutting station, rollers 464 will urge the blank laterally of the conveyor chains so that the end of the blank will engage guide 462 for proper location of the blank.

Figure 22:
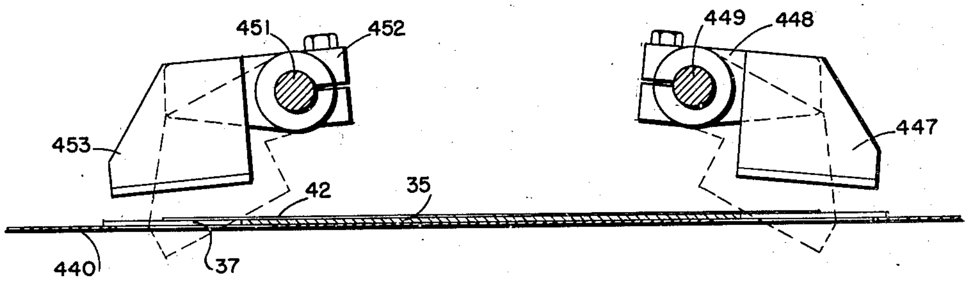
Fig. 22 is a sectional view on the line 22—22 of Fig. 4.
Figure 23:
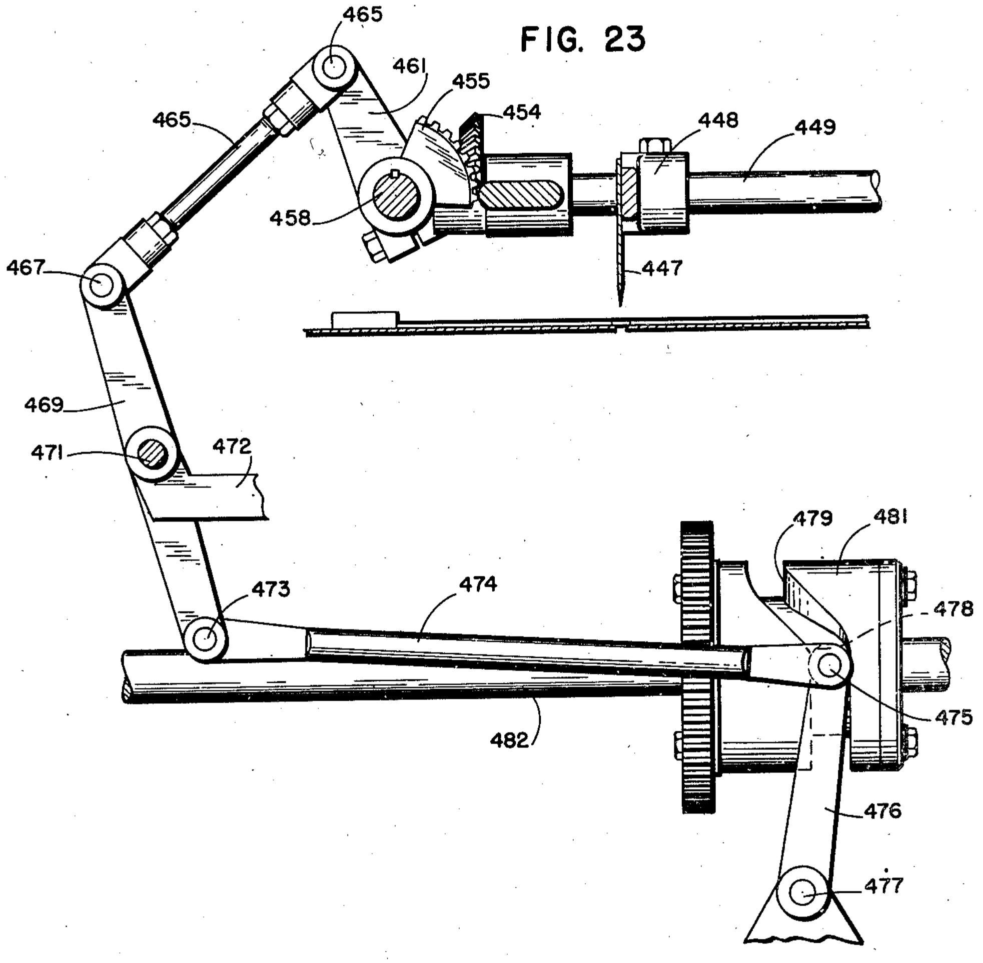
Fig. 23 is a partial sectional view of the actuating mechanism for the slitting knives taken on the line 23—23 of Fig. 4.

With reference to Figs. 22 and 23 the crank arm 461 which drives the shaft 458 to actuate the cutting knives is driven by means of a connecting link 465, one end of which is pivoted at 466 to said lever and the other end of which is pivoted at 467 to one end of a two-armed lever 469. The intermediate portion of lever 469 is fastened to a shaft 471 pivoted in bearing members 472 on the frame. The other arm of lever 469 is pivotally connected at 473 to a rod 474, the other end of which is pivotally supported at 475 on lever 476 pivoted to the frame at 477. A cam roller 478 at the end of rod 474 and lever 476 travels in a cam slot 479 on a cam member 481. Cam 481 in turn is fastened to a shaft 482 which is driven intermittently by mechanism described below. At each rotation of driven shaft 482 the cam slot 479 is so arranged that it will shift the end of lever 476 and rod 474 to move the cutting knives 447 and 453 from the heavy line position of Fig. 22 to the dotted line position of said line and then immediately back to the heavy line position. One such cutting or slitting operation will take place for each rotation of shaft 482.

Figures 24, 25:
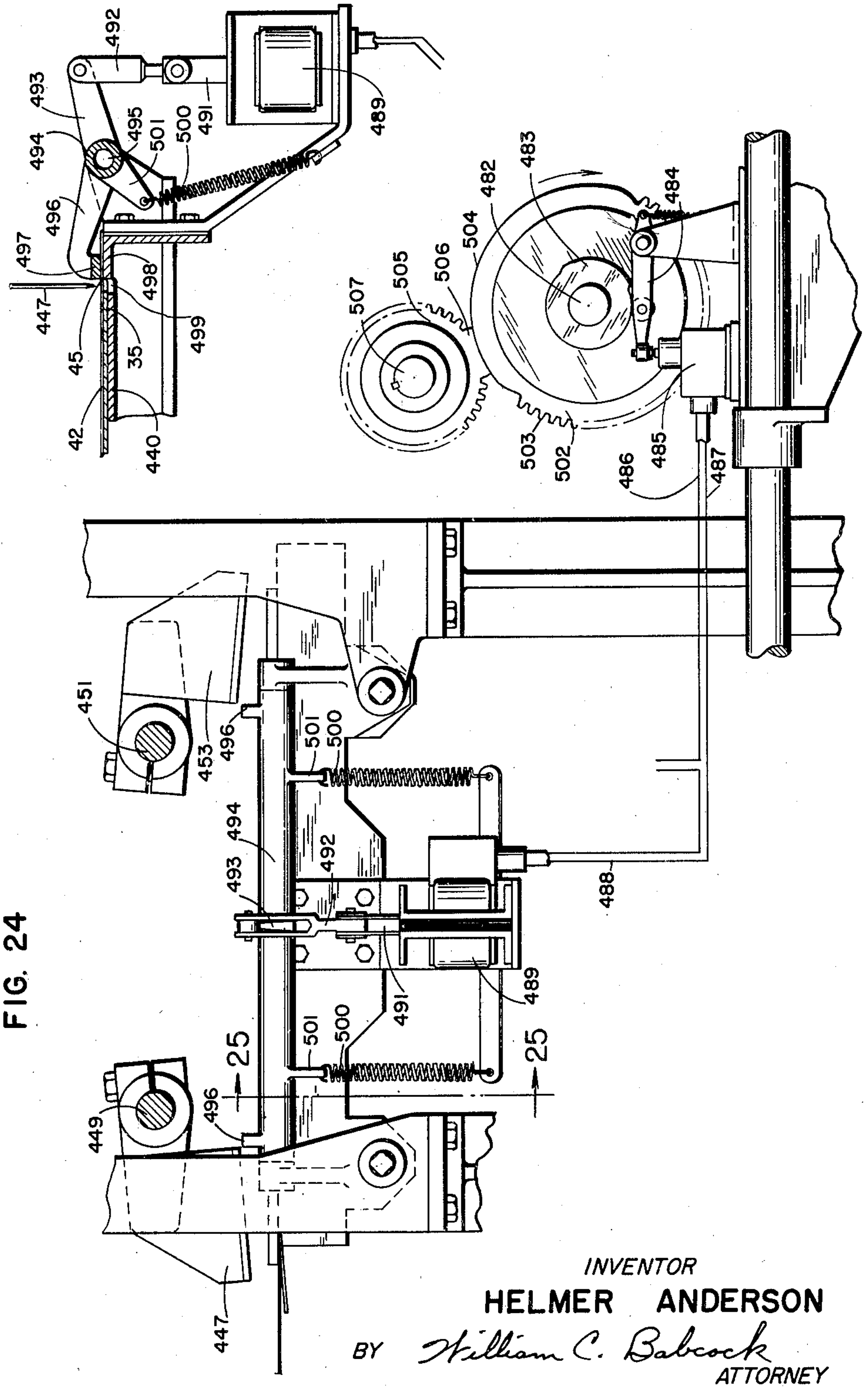
Fig. 24 is an end view of a portion of the slitting mechanism taken from the lines 24—24 of Fig. 4.
Fig. 25 is a partial sectional view showing details of the clamping mechanism of the slitter, taken on the line 25—25 of Fig. 24.

With reference to Figs. 24 and 25, one end of shaft 482 carries a switch-actuating cam 483 designed to control a clamping device for the flap 45 at the end of each blank. Thus cam 483 will engage and depress a switch-actuating lever 484 once for each rotation of shaft 482. Lever 484 when depressed, operates a switch 485 which is connected in circuit with a solenoid 489 by means of wires 486, 487, and 488. The core 491 of solenoid 489 is connected by a link 492 to a crank arm 493 on a sleeve 494. This sleeve is pivotally mounted on a shaft 495 journaled in the frame of the machine. Clamping arms 496 are formed integrally with sleeve 494 and carry at their outer end a horizontal clamp 496 which is adapted to clamp the flap 45 extending from one edge of blank 35 against a cooperating supporting ledge 498 on the frame. A slot 499 separates the ledge 498 from the central bed 449 of the machine and this slot permits the passage of slitting knives 447 and 453. The knives will slit the lining material immediately adjacent the end of the blank to a depth corresponding to that of the slots in the remaining portion of the blank. Thus when the blank is assembled and flap 45 overlaps the adjacent wall of the final carton, the slitting of this flap adjacent the end of the blank will facilitate the folding of the top and bottom carton flaps just as the corresponding slitting above slots 37 likewise facilitates such folding.

Springs 500 connected to crank arms 501 on sleeve 494 normally hold clamp 497 down against flap 45 so that the flap 45 will be held under tension to facilitate the cutting operation. Each time solenoid 489 is actuated, the parts will be moved so that clamp 497 is lifted and flap 45 and blank 35 are free to move to the next station so that a succeeding blank can be fed into position at the cutting station. The position of cam 483 which controls the actuation of solenoid 489 will be located so as to release clamp 497 just prior to and during the intermittent feeding movement of chains 442.

Driven shaft 482 drives the conveyor chains intermittently by means of an interrupted gear 502 fastened to shaft 482. Such gears are well known and include a toothed portion 503 and an intermediate flat portion or dwell 504. This interrupted gear drives a similar gear 505 likewise provided with a flat or dwell portion 506. Gear 505 is keyed to one end of intermediate drive shaft 507. The other end of shaft 507 (shown in Fig. 26) carries a gear 508 which meshes with a gear 509 on conveyor drive shaft 445.

In the position shown in Fig. 24 shaft 482, when driven in the direction of the arrow, will actuate switch 485 and solenoid 489 to release clamp 497 just before the toothed portion 503 of gear 502 begins to engage the teeth of gear 505 to drive the conveyor chains. After the driving movement, shaft 507 returns to the position of Fig. 24 and remains in said position while the flat dwell of gear 502 passes over the corresponding dwell 506 of gear 505. During this portion of the rotation of shaft 482 there will be no movement of the conveyor chains. It is during this rotation of the shaft 482 that the clamp 497 holds flap 45 and the slitting knives are actuated by the cam 481 and linkage described above.

Figure 26:
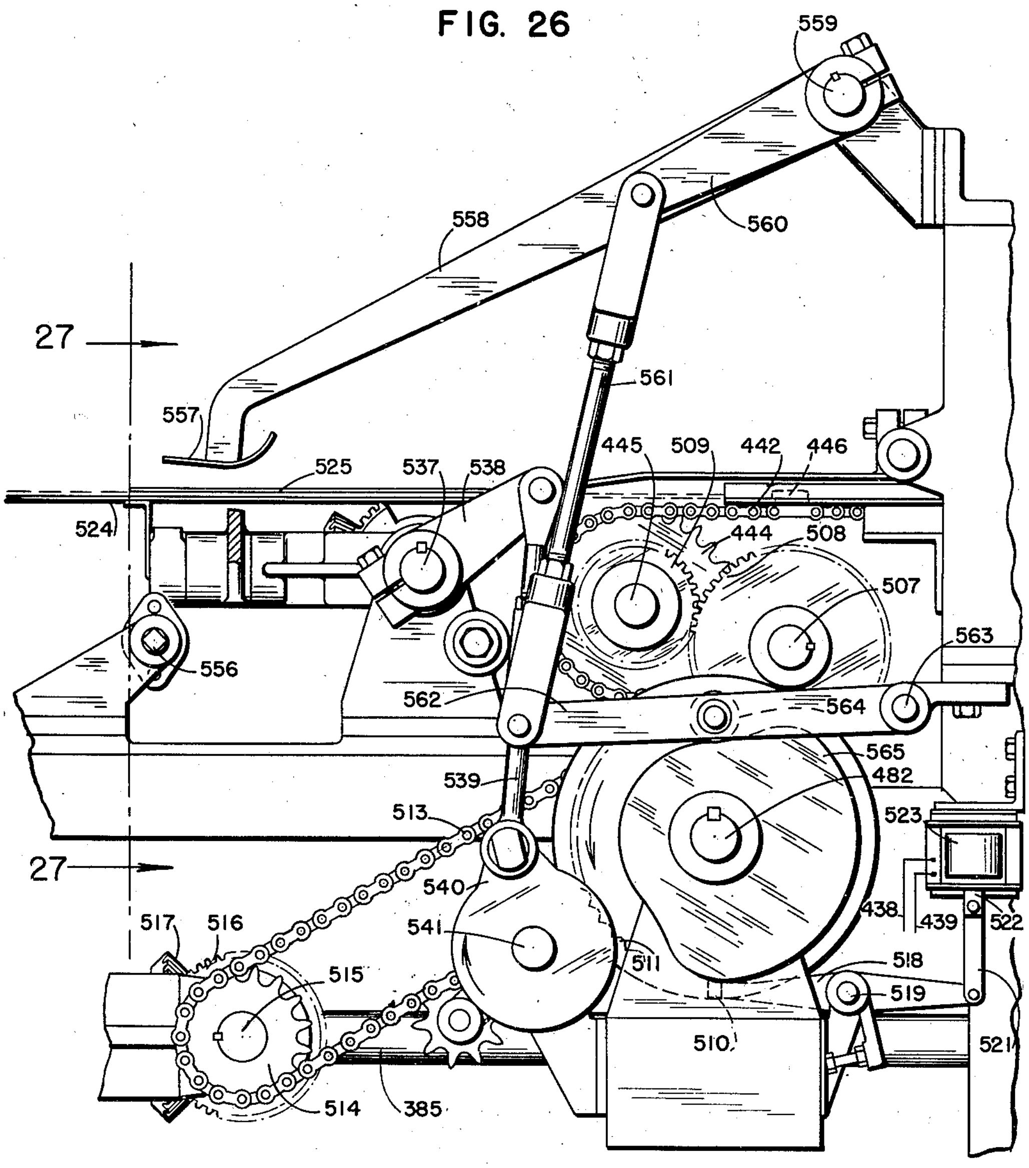
Fig. 26 is a partial side elevation of the folding station taken on the line 26—26 of Fig. 4.

It was pointed out above that shaft 482 is driven intermittently one revolution at a time. To control this movement a one-revolution clutch is provided which is similar to those already described. A clutch pawl fastened to shaft 482 is provided with a throw-out arm 510 (Fig. 26). This pawl is adapted to engage the teeth of a constantly rotating drive gear 511. Gear 511 is mounted for free rotation on shaft 482 and is fastened to a sprocket 512 (Fig. 27) connected by a chain 513 to a driving sprocket 514 on cross shaft 515. This cross shaft carries a bevel gear 516 at its opposite end and said gear meshes with a similar bevel gear 517 on the main power shaft 385 of the slitting and folding unit. It will be recalled that shaft 385 is connected to the main driving motor 70 and is rotated constantly as long as said motor is in operation.

A blocking lever 518 (Fig. 26) controls the actuation of the clutch pawl 510 to rotate shaft 482. This lever 518 is pivotally mounted at 519 in the frame and is connected by a link 521 to the core 522 of a solenoid 523. Solenoid 523 is energized by means of wires 438 and 439, which together with wire 437 connect the solenoid 523 in circuit with control switch 436 (Fig. 3) previously described. From the previous description it will be clear that solenoid 523 is actuated each time the transfer mechanism has completed the feeding of an additional blank onto the bed of the slitting and folding unit. Thus as soon as the blank is in position, in this latter unit the control lever 518 will be moved and the shaft 482 will be driven for one complete revolution, to move the conveyor chains and carry the blank to the cutting station, to clamp the flap 45 at the end of the blank and to slit the lining material as described.

*Folding mechanism*

Figure 27:
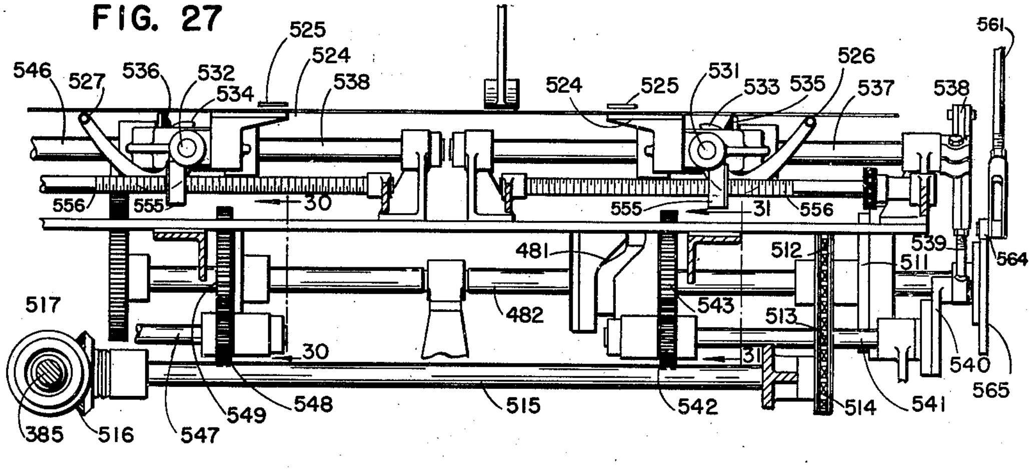
Fig. 27 is a partial end elevation of the folding station taken on the line 27—27 of Fig. 26.
Figure 28:
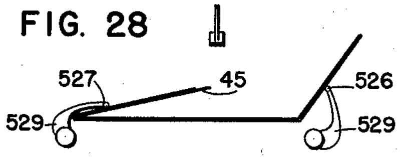
Fig. 28 is a schematic view illustrating the timing of the folding arms with the blank in partially folded position.

After the blanks leave the slitting station they are carried by the conveyor chains onto the supporting plates 524 of a folding station (Figs. 4, 26, and 27). Bars 525 are positioned above the blank so that the outer edges of these bars are just inside the desired fold line and will serve as guides to prevent buckling of the blank and provide a clean-cut fold line. The purpose of this station is to fold the end flaps and body sections of the blank inwardly so that the two end edges of the blank are located adjacent each other at the center of the blank in position for application of a suitable corner tape. This action is illustrated in general in Figs. 28 and 29 which indicate that the end section of the blank which carries the extending flap 45 is first folded over, after which the other end section is folded down so that the edges of the blank lie next to each other with the lining flap 45 extending across the joint on the inside of the blank.

To fold the end sections of the blank around the guides 525 folding bars 526 and 527 are provided. These bars are carried by arms 528 and 529 which are in turn fastened to shafts 531 and 532 (Fig. 27). Beveled gear segments 533 and 534 on shafts 531 and 532 are driven by similar segments 535 and 536 respectively. These latter segments are keyed on drive shafts 537 and 546 so that they will be oscillated by the intermittent backward and forward rotation of said shafts.

Figure 31:
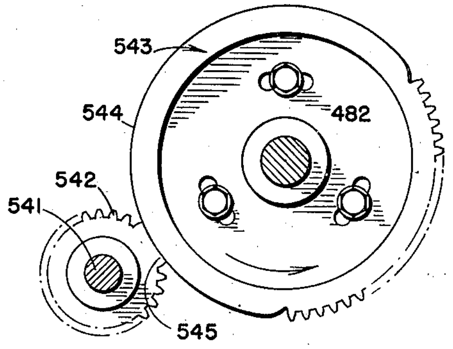
Fig. 31 is a view similar to Fig. 30 taken on the line 31—31 of Fig. 27.

Shaft 537 is driven by a crank arm 538 (Figs. 26 and 27) which is connected by a link 539 to a driving crank 540 on shaft 541. This latter shaft is rotated intermittently in the direction shown by the arrow by means of an interrupted gear 542 (Fig. 27). As shown in Fig. 31 gear 542 has an intermediate dwell 545 which cooperates with the relatively large flat or dwell section 544 of the interrupted driving gear 543. Gear 543 is carried by shaft 482 which is intermittently operated one revolution at a time as described above.

Each time shaft 482 makes one complete revolution shaft 541 will be held stationary during that portion of the rotation of shaft 542 in which a new blank is being fed into position by the conveyor chains. Then as the toothed portion of gear 543 comes into position, the gear 542 and shaft 541 will make one complete revolution which will rotate the crank 540 and thus oscillate shaft 537 to move folding bar 526 from the position of Fig. 27 to the position of Fig. 28, then to the position of Fig. 29 and back to the original position.

Figure 30:
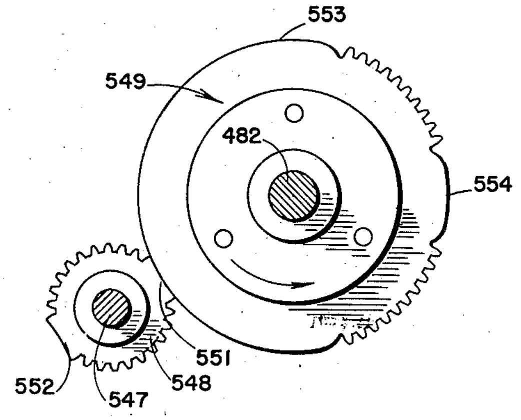
Fig. 30 is a sectional view on the line 30—30 of Fig. 27 illustrating the driving gears for the folding section.

Folding bar 527 is actuated in a similar manner by means of cranks and links (not shown) which connect shaft 546 to shaft 547 (Fig. 27). An interrupted gear 548 on shaft 547 cooperates with an interrupted driving gear 549 on shaft 482. These gears are shown in Fig. 30 and differ from the gears of Fig. 31 by reason of the presence of two flat or dwell portions in each gear. Thus gear 548 has diametrically opposed dwells 551 and 552. Similarly gear 549 has a relatively long dwell 553 and a relatively short dwell portion 554.

When shaft 482 is driven through its periodic revolution, the dwell 553 will engage the dwell 551 to hold shaft 547 stationary while a blank is being fed into position by the conveyor chains. The toothed portions of the gears will then engage to move the parts so that folding bar 527 moves from the position of Fig. 27 to the position of Fig. 28 and on to the position of Fig. 29. When the parts are in the position corresponding to Fig. 29, the dwell 554 of gear 549 will briefly engage the dwell 552 of gear 548 to hold bar 527 in the position of Fig. 29 while the other flap is folded down. The relative position of the respective interrupted driving gears 543 and 549 is such that arm 527 will complete its folding movement first, in order to make sure that the extended flap 45 is folded down before the opposite edge of the blank comes into position. Thus flap 45 will always be on the inside of the partially assembled carton.

In order that the folding bars 526 and 527 may accommodate blanks of different size these bars and their associated gears, including gears 535 and 536, are adjustably mounted for lateral movement with respect to the frame of the machine. Thus, the gears 535 and 536 are keyed to shafts 537 and 546 but are free to move longitudinally of the shafts. Brackets 555 on the folding bar supports are engaged by threaded shafts 556 which may be rotated to move the folding bars and their mechanism back and forth across the machine as desired.

Figure 29:
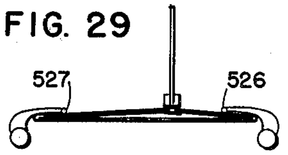
Fig. 29 is a view similar to Fig. 28 with the blank completely folded.

To hold the blank in the folded position in Fig. 29 after the folding bars 526 and 527 are retracted a clamp 557 is provided. This clamp is carried by a long arm 558 fastened to a shaft 559 pivoted to the frame (Fig. 26). A crank arm 560 on shaft 559 is connected by a rod 561 to an actuating arm 562 pivoted to the frame at 563. A cam roller 564 on arm 562 bears against the peripheral surface of a cam 565 carried by shaft 482. When the raised portion of this cam engages the roller, the linkage will raise the clamping member 557 upwardly to the position of Fig. 28 so that there will be room for the flaps to be folded into position. As soon as the flaps are folded, the clamp 557 is permitted to drop of its own weight, by reason of the lowered section of the cam, so that said clamp holds the flaps in the position of Fig. 29 where they may be taped or grasped by the operator of the machine.

As described in the foregoing specification, a method and apparatus have been provided which facilitate the production of lined box blanks in which the lining overlaps the slots between the blank flaps and accordingly has to be slit to correspond to such slots. This method and apparatus accomplish the objects and offer the advantages set forth above. Since many changes and modifications may be made in the specific structure shown herein, without departure from the essential teachings of this specification, it is my intent that all such changes shall be considered a part of this invention as fall within the spirit and scope of the attached claims.

Now, therefore, I claim:

1. The method of lining slotted blanks which comprises feeding said blanks in spaced relation, fastening a continuous strip of lining material to a plurality of said spaced blanks with the material overlying a portion of said slots, severing the material between the blanks, and slitting the material at said slots.

2. The method of lining slotted blanks which comprises feeding said blanks in spaced relation in a direction perpendicular to the slots, fastening a continuous strip of lining material to a plurality of said spaced blanks with the material overlying a portion of said slots, severing the material between the blanks, and slitting the material at said slots.

3. The method of claim 2 including severing the material between the blanks at a point adjacent one end of each blank and thereby providing an extending flap of material at the opposite end of each blank.

4. The method of claim 3 including slitting the edges of the extending flap of material adjacent the blank and parallel to said slots.

5. The method of lining blanks having slots between adjacent flaps in an edge of each blank which comprises feeding said blanks in spaced relation in a direction parallel to said edges and transversely of said slots, feeding a continuous strip of lining material in said direction, fastening the material to said spaced blanks with one edge of the material overlapping said slots and flaps, severing the material between the blanks, and slitting the material at each slot to permit individual movement of said flaps.

6. The method of lining blanks having slots between adjacent flaps in an edge of each blank, which comprises feeding said blanks in spaced relation in a direction parallel to said edges and transversely of said slots, feeding a continuous strip of lining material in said direction, fastening the material to said spaced blanks with one edge of the material overlapping an inner portion only of said slots and flaps, severing the material between the blanks, and slitting the material at each slot to permit individual movement of said flaps.

7. Apparatus for lining slotted blanks comprising means for feeding said blanks in spaced relation, means for fastening a continuous strip of lining material successively to each spaced blank, cutting means for severing the material between the blanks, and slitting mechanism for cutting the material at each slot of said blank.

8. Apparatus according to claim 4 in which said slitting mechanism includes movable knives, and positioning means for accurate location of each blank with respect to the knives.

9. Apparatus according to claim 4 in which said slitting mechanism includes movable knives, positioning means for accurate location of each blank with respect to the knives, and a clamping member engaging a portion of the lined blank while said material is being slit.

10. Apparatus for lining slotted blanks comprising means for feeding said blanks in spaced relation in a direction perpendicular to said slots, means for feeding a continuous strip of lining material in the same direction and for laminating said material successively to said blanks with the material overlapping a portion of said slots, cutting means for severing the material between successive blanks, slitting means for cutting the material at each overlapped slot, and driving means connected to said blank feeding, material feeding and laminating, cutting and slitting means and driving all of said means in timed relation.

11. Apparatus according to claim 10 in which said driving means includes control means actuated by the blanks to prevent feeding and laminating of said material when the supply of blanks is interrupted, and second control means actuated by the lining material to stop said driving means when the supply of material is interrupted.

12. Apparatus according to claim 10 in which said cutting means severs the material adjacent the end of one blank leaving a flap of material extending beyond the opposite end of the adjacent blank, said slitting means including a movable knife for slitting said flap adjacent the end of the blanks.

13. Apparatus according to claim 10 in which said cutting means severs the material adjacent the end of one blank leaving a flap of material extending beyond the opposite end of the adjacent blank, said slitting means including a clamp movable to engage and hold said extending flap, and a movable knife for slitting said flap adjacent the end of the blank, said driving means including mechanism for actuating said knife while said clamp holds said flap.

14. Apparatus for lining and folding blanks having three slots in an edge of each blank to provide four adjacent flaps, which comprises means for feeding said blanks in spaced relation in a direction perpendicular to said slots and parallel to said edge, roller means for feeding a continuous strip of lining material in the same direction and fastening said strip to the successive spaced blanks with the material overlapping a portion of each slot, cutting means for severing the material between the blanks, slitting mechanism for cutting the material at each overlapped slot, folding mechanism for folding the ends of the blank back against the central area of the blank along the lines of the two outer slots, and driving means connected to said feeding means, roller means, cutting means, and slitting and folding mechanisms for operating said parts in timed relation.

15. Apparatus as in claim 14 in which the cutting means severs the material adjacent the end of one blank leaving a flap of material extending from the opposite end of the adjacent blank, said folding mechanism including separate folding members for each end of the blank, and said driving means including a first connection for actuating the folding member for the flap end of the blank and a second connection for actuating the folding member for the other end of the blank, said first connection completing the folding of the flap end before the second connection completes the folding of the other end.

16. Apparatus as in claim 14 in which said slitting and folding mechanisms include a common conveyor feeding the lined blanks transversely of the original direction of feed and parallel to said slots.

17. A slitting and folding unit for lined blanks which have slots in an edge of the blank and a layer of lining material overlying a portion of said slots, said unit comprising intermittent conveyor means for feeding said blanks in a direction parallel to said slots, a slitting station at which said blanks are stopped, a movable slitting knife mounted at said station in alignment with one of said slots to slit the material overlying said slot, a folding station at which said blanks are next stopped, a movable folding arm for engaging the end of each blank and folding said end back against the central portion of the blank with the line of folding including said slot, a common drive shaft for said conveyor, knife and arm, means for rotating said shaft intermittently one revolution at a time, a first control member on said shaft operatively connected to said conveyor for moving the latter during only a portion of the rotation of the shaft, a second control member on said shaft operatively connected to said knife to move the latter into cutting engagement with the material during a different portion of the rotation of the shaft, and a third control member on said shaft for moving said arm to folding position during said different portion of rotation of the shaft.

18. Apparatus as in claim 17 in which said first and third control members consist of interrupted gears and said second control member consists of a cam.

19. Apparatus as in claim 17 having a guide member at one edge of said conveyor parallel to said direction of feed and extending through said slitting station, and means urging an end of each blank against the guide to align the blank while it is fed to said station.

20. Apparatus as in claim 17 having a guide member at one edge of said conveyor parallel to said direction of feed and extending through said slitting station, and means urging an end of each blank against the guide to align the blank while it is fed to said station, said last mentioned means comprising an angularly mounted roller engaging a surface of said blank.

HELMER ANDERSON.

REFERENCES CITED

The following references are of record in the file of this patent:

UNITED STATES PATENTS

| Number | Name | Date |
|---|---|---|
| 200,307 | Jaeger | Feb. 12, 1878 |
| 695,369 | Birnie et al. | Mar. 11, 1902 |
| 1,379,275 | Moore | Mar. 24, 1921 |
| 1,404,788 | Moore | Jan. 31, 1922 |
| 1,947,664 | Staude | Feb. 20, 1934 |
| 2,414,109 | Knowlton et al. | Jan. 14, 1947 |

Certificate of Correction

Patent No. 2,502,117 March 28, 1950

HELMER ANDERSON

It is hereby certified that errors appear in the printed specification of the above numbered patent requiring correction as follows:

Column 23, lines 36 and 40, for the claim reference numeral "4" read 7;

and that the said Letters Patent should be read with these corrections therein that the same may conform to the record of the case in the Patent Office.

Signed and sealed this 8th day of August, A. D. 1950.

[SEAL]

THOMAS F. MURPHY,
*Assistant Commissioner of Patents.*